United States Patent
Deller et al.

(10) Patent No.: US 11,908,472 B1
(45) Date of Patent: *Feb. 20, 2024

(54) CONNECTED ACCESSORY FOR A VOICE-CONTROLLED DEVICE

(71) Applicant: Amazon Technologies, Inc., Seattle, WA (US)

(72) Inventors: Derick Deller, Capistrano Beach, CA (US); Link Cornelius, Huntington Beach, CA (US); Apoorv Naik, Carlsbad, CA (US); Zoe Adams, Orange County, CA (US); Aslan Appleman, Playa Vista, CA (US); Pete Klein, Tustin, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/941,791

(22) Filed: Sep. 9, 2022

Related U.S. Application Data

(63) Continuation of application No. 16/668,866, filed on Oct. 30, 2019, now Pat. No. 11,443,739, which is a
(Continued)

(51) Int. Cl.
*G10L 15/22* (2006.01)
*G10L 15/18* (2013.01)
(Continued)

(52) U.S. Cl.
CPC ............. *G10L 15/22* (2013.01); *G06F 3/167* (2013.01); *G06F 40/295* (2020.01);
(Continued)

(58) Field of Classification Search
CPC ....... G10L 15/22; G10L 13/047; G10L 13/10; G10L 15/142; G10L 15/14;
(Continued)

(56) References Cited

U.S. PATENT DOCUMENTS

| 5,012,520 A | 4/1991 | Steeger |
| 6,332,123 B1 | 12/2001 | Kaneko et al. |

(Continued)

OTHER PUBLICATIONS

Office Action for U.S. Appl. No. 15/473,348, dated Feb. 19, 2020, Klein, "Accessory for a Voice Controlled Device for Output of Supplementary Content", 24 Pages.
(Continued)

*Primary Examiner* — Huyen X Vo
(74) *Attorney, Agent, or Firm* — Lee & Hayes, P.C.

(57) ABSTRACT

Coordinated operation of a voice-controlled device and an accessory device in an environment is described. A remote system processes audio data it receives from the voice-controlled device in the environment to identify a first intent associated with a first domain, a second intent associated with a second domain, and a named entity associated with the audio data. The remote system sends, to the voice-controlled device, first information for accessing main content associated with the named entity, and a first instruction corresponding to the first intent. The remote system also sends, to the accessory device, second information for accessing control information or supplemental content associated with the main content, and a second instruction corresponding to the second intent. The first and second instructions, when processed by the devices in the environment, cause coordinated operation of the voice-controlled device and the accessory device.

20 Claims, 10 Drawing Sheets

Related U.S. Application Data continuation of application No. 16/188,204, filed on Nov. 12, 2018, now Pat. No. 10,468,027, which is a continuation of application No. 15/413,105, filed on Jan. 23, 2017, now Pat. No. 10,127,908.

(60) Provisional application No. 62/421,207, filed on Nov. 11, 2016.

(51) Int. Cl.

| | | |
|---|---|---|
| *G10L 13/10* | (2013.01) | |
| *G06T 13/20* | (2011.01) | |
| *G10L 13/047* | (2013.01) | |
| *G10L 15/30* | (2013.01) | |
| *G10L 15/14* | (2006.01) | |
| *H04L 67/306* | (2022.01) | |
| *H04L 67/12* | (2022.01) | |
| *H04L 67/02* | (2022.01) | |
| *G10L 15/26* | (2006.01) | |
| *G06F 3/16* | (2006.01) | |
| *H04L 67/025* | (2022.01) | |
| *G06F 40/295* | (2020.01) | |
| *G10L 15/08* | (2006.01) | |
| *G10L 13/00* | (2006.01) | |

(52) U.S. Cl.
CPC .......... *G06T 13/205* (2013.01); *G10L 13/047* (2013.01); *G10L 13/10* (2013.01); *G10L 15/142* (2013.01); *G10L 15/1815* (2013.01); *G10L 15/26* (2013.01); *G10L 15/30* (2013.01); *H04L 67/02* (2013.01); *H04L 67/025* (2013.01); *H04L 67/12* (2013.01); *H04L 67/306* (2013.01); *G10H 2210/076* (2013.01); *G10L 13/00* (2013.01); *G10L 2015/088* (2013.01); *G10L 2015/223* (2013.01)

(58) Field of Classification Search
CPC ..... G10L 15/1815; G10L 15/18; G10L 15/26; G10L 15/30; G10L 13/00; G10L 2015/088; G10L 15/08; G10L 2015/223; G06F 3/167; G06F 3/16; G06F 40/295; G06T 13/205; G06T 13/20; H04L 67/02; H04L 67/025; H04L 67/12; H04L 67/306; G10H 2210/375
See application file for complete search history.

(56) References Cited

U.S. PATENT DOCUMENTS

| | | | |
|---|---|---|---|
| 6,572,431 B1 | 6/2003 | Maa | |
| 7,503,006 B2 | 3/2009 | Danieli | |
| 8,412,798 B1* | 4/2013 | Wang | H04L 67/52 709/217 |
| 8,516,533 B2 | 8/2013 | Davis et al. | |
| 8,666,528 B2 | 3/2014 | Harkness et al. | |
| 8,670,393 B2 | 3/2014 | Jain et al. | |
| 8,781,828 B2 | 7/2014 | Park et al. | |
| 8,917,971 B2 | 12/2014 | Woods et al. | |
| 9,418,395 B1 | 8/2016 | Gish et al. | |
| 9,491,522 B1 | 11/2016 | Trollope et al. | |
| 9,536,527 B1 | 1/2017 | Carlson | |
| 9,558,733 B1 | 1/2017 | Korn | |
| 9,666,204 B2 | 5/2017 | Manjunath et al. | |
| 9,698,999 B2 | 7/2017 | Mutagi | |
| 9,858,927 B2 | 1/2018 | Williams et al. | |
| 9,986,296 B2 | 5/2018 | Buchner et al. | |
| 10,133,546 B2 | 11/2018 | Hart et al. | |
| 10,212,066 B1 | 2/2019 | Carlson | |
| 10,264,329 B2 | 4/2019 | Accardo et al. | |
| 10,366,692 B1 | 7/2019 | Adams et al. | |
| 10,388,272 B1 | 8/2019 | Thomson et al. | |
| 10,540,976 B2 | 1/2020 | Van Os et al. | |
| 10,573,312 B1 | 2/2020 | Thomson et al. | |
| 10,622,009 B1 | 4/2020 | Zhang et al. | |
| 10,650,621 B1 | 5/2020 | King et al. | |
| 10,726,830 B1 | 7/2020 | Mandal et al. | |
| 10,911,596 B1 | 2/2021 | Do et al. | |
| 10,991,373 B1 | 4/2021 | Wang et al. | |
| 11,069,364 B1 | 7/2021 | Souza et al. | |
| 11,087,739 B1 | 8/2021 | Rastrow et al. | |
| 11,120,800 B1 | 9/2021 | Cheng et al. | |
| 11,170,776 B1 | 11/2021 | Whalin | |
| 11,195,531 B1 | 12/2021 | Adams et al. | |
| 11,200,892 B1 | 12/2021 | Stoops et al. | |
| 11,295,743 B1 | 4/2022 | Bumberger et al. | |
| 11,355,098 B1 | 6/2022 | Zhong et al. | |
| 11,393,473 B1 | 7/2022 | Fenster et al. | |
| 11,417,328 B1 | 8/2022 | Katta et al. | |
| 11,475,881 B2 | 10/2022 | Mandal et al. | |
| 11,495,215 B1 | 11/2022 | Wu et al. | |
| 11,501,794 B1 | 11/2022 | Kim et al. | |
| 11,528,571 B1 | 12/2022 | Liu et al. | |
| 11,532,301 B1 | 12/2022 | Hajebi et al. | |
| 11,551,685 B2 | 1/2023 | Rastrow et al. | |
| 11,557,292 B1 | 1/2023 | Wang et al. | |
| 11,574,628 B1 | 2/2023 | Kumatani et al. | |
| 11,574,637 B1 | 2/2023 | Kumar et al. | |
| 2002/0186676 A1 | 12/2002 | Milley et al. | |
| 2004/0015363 A1 | 1/2004 | Rhoads | |
| 2004/0034655 A1 | 2/2004 | Tecu et al. | |
| 2005/0137860 A1 | 6/2005 | Nam | |
| 2005/0216271 A1 | 9/2005 | Konig | |
| 2005/0282603 A1 | 12/2005 | Parrott et al. | |
| 2006/0159303 A1 | 7/2006 | Davis et al. | |
| 2006/0269056 A1 | 11/2006 | Montag | |
| 2007/0116297 A1 | 5/2007 | Mishra | |
| 2008/0319563 A1 | 12/2008 | Shimizu et al. | |
| 2009/0150553 A1 | 6/2009 | Collart et al. | |
| 2010/0205628 A1 | 8/2010 | Davis et al. | |
| 2010/0280641 A1 | 11/2010 | Harkness et al. | |
| 2010/0312547 A1 | 12/2010 | Van Os et al. | |
| 2012/0140957 A1 | 6/2012 | Poulsen et al. | |
| 2013/0039154 A1 | 2/2013 | Bulgin et al. | |
| 2013/0102241 A1 | 4/2013 | Devine et al. | |
| 2013/0141643 A1 | 6/2013 | Carson et al. | |
| 2013/0152139 A1 | 6/2013 | Davis et al. | |
| 2013/0152147 A1 | 6/2013 | Toney, Jr. | |
| 2013/0170813 A1 | 7/2013 | Woods et al. | |
| 2013/0289983 A1 | 10/2013 | Park et al. | |
| 2013/0347018 A1 | 12/2013 | Limp et al. | |
| 2014/0241130 A1 | 8/2014 | McGinn et al. | |
| 2014/0278438 A1* | 9/2014 | Hart | G06F 3/167 704/275 |
| 2014/0343703 A1 | 11/2014 | Topchy et al. | |
| 2015/0025664 A1 | 1/2015 | Cory et al. | |
| 2015/0127228 A1 | 5/2015 | Jeong et al. | |
| 2015/0146885 A1 | 5/2015 | Fitzgerald | |
| 2015/0154976 A1 | 6/2015 | Mutagi | |
| 2015/0195620 A1 | 7/2015 | Buchner et al. | |
| 2015/0317977 A1 | 11/2015 | Manjunath et al. | |
| 2015/0370323 A1 | 12/2015 | Cieplinski et al. | |
| 2016/0057317 A1 | 2/2016 | Zhao et al. | |
| 2016/0094894 A1 | 3/2016 | Inayatullah et al. | |
| 2016/0165286 A1 | 6/2016 | Zhang et al. | |
| 2016/0189249 A1 | 6/2016 | Meyer et al. | |
| 2016/0191356 A1 | 6/2016 | Sundaresan | |
| 2016/0212474 A1 | 7/2016 | Canipe et al. | |
| 2017/0026701 A1 | 1/2017 | Shaw et al. | |
| 2017/0060530 A1 | 3/2017 | Maker, III | |
| 2017/0083285 A1* | 3/2017 | Meyers | G10L 15/00 |
| 2017/0083468 A1 | 3/2017 | Sengoku | |
| 2017/0092277 A1 | 3/2017 | Sandison | |
| 2017/0236512 A1 | 8/2017 | Williams et al. | |
| 2017/0245051 A1* | 8/2017 | Lang | G06F 3/165 |
| 2017/0264728 A1 | 9/2017 | Lu et al. | |
| 2017/0300289 A1 | 10/2017 | Gattis | |
| 2017/0302988 A1 | 10/2017 | Jiang | |
| 2017/0374465 A1 | 12/2017 | Family et al. | |
| 2018/0061419 A1* | 3/2018 | Melendo Casado | G10L 25/78 |

(56) References Cited

U.S. PATENT DOCUMENTS

| | | | |
|---|---|---|---|
| 2018/0088902 A1* | 3/2018 | Mese | G10L 15/22 |
| 2018/0270576 A1 | 9/2018 | Chua et al. | |
| 2020/0349928 A1 | 11/2020 | Mandal et al. | |
| 2021/0295833 A1 | 9/2021 | Rastrow et al. | |
| 2022/0093093 A1 | 3/2022 | Krishnan et al. | |
| 2022/0093094 A1 | 3/2022 | Krishnan et al. | |
| 2022/0093101 A1 | 3/2022 | Krishnan et al. | |
| 2022/0104015 A1 | 3/2022 | McDevitt et al. | |
| 2022/0358921 A1 | 11/2022 | Bumberger et al. | |
| 2022/0415307 A1 | 12/2022 | Kockerbeck et al. | |

OTHER PUBLICATIONS

Non Final Office Action dated Feb. 27, 2019 for U.S. Appl. No. 15/473,348 "Accessory for a Voice Controlled Device for Output of Supplementary Content" Klein, 20 pages.

Office Action for U.S. Appl. No. 16/523,188, dated Mar. 31, 2021, "Accessory for a Voice-Controlled Device", 13 Pages.

Office Action for U.S. Appl. No. 16/523,188, dated Jun. 23, 2020, Adams, "Accessory for a Voice-Controlled Device", 12 Pages.

Office Action for U.S. Appl. No. 16/523,188, dated Nov. 6, 2020, Adams, "Accessory for a Voice-Controlled Device", 11 Pages.

Non Final Office Action dated Nov. 28, 2018 for U.S. Appl. No. 15/595,658 "Accessory for a Voice-Controlled Device" Adams, 18 pages.

Office Action for U.S. Appl. No. 15/473,348, dated Dec. 22, 2017, Klein, "Accessory for a Voice-Controlled Device", 17 pages.

Office Action for U.S. Appl. No. 16/668,866, dated Feb. 1, 2022, Delller, "Connected Accessory for a Voice-Controlled Device", 10 pages.

Office Action for U.S. Appl. No. 15/595,658, dated Jun. 13, 2018, Adams, "Accessory for a Voice-Controlled Device", 18 pages.

Office Action for U.S. Appl. No. 15/473,348, dated Jul. 9, 2018, Klein, "Accessory for a Voice-Controlled Device", 23 pages.

Office Action for U.S. Appl. No. 15/473,348, dated Aug. 26, 2019, Klein, "Accessory for a Voice Controlled Device for Output of Supplementary Content", 24 pages.

Office Action for U.S. Appl. No. 17/543,589, dated Feb. 24, 2023, Inventor #1 Zoe Adams, "Accessory for a Voice-Controlled Device", 19 pages.

* cited by examiner

CONNECTED ACCESSORY FOR A VOICE-CONTROLLED DEVICE

CROSS REFERENCE TO RELATED APPLICATIONS

This application is a continuation of, and claims priority to U.S. patent application Ser. No. 16/668,866, filed on Oct. 30, 2019, entitled "CONNECTED ACCESSORY FOR A VOICE-CONTROLLED DEVICE" and U.S. patent application Ser. No. 16/188,204, filed on Nov. 12, 2018, entitled "CONNECTED ACCESSORY FOR A VOICE-CONTROLLED DEVICE" and U.S. patent application Ser. No. 15/413,105, filed on Jan. 23, 2017, entitled "CONNECTED ACCESSORY FOR A VOICE-CONTROLLED DEVICE" which claims priority to U.S. Provisional Application No. 62/421,207, filed on Nov. 11, 2016, entitled "CONNECTED ACCESSORY FOR A VOICE-CONTROLLED DEVICE," the contents of which are herein incorporated by reference.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech input and gestures. Discussed herein are technological improvements for, among other things, these computing devices and systems involving the computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
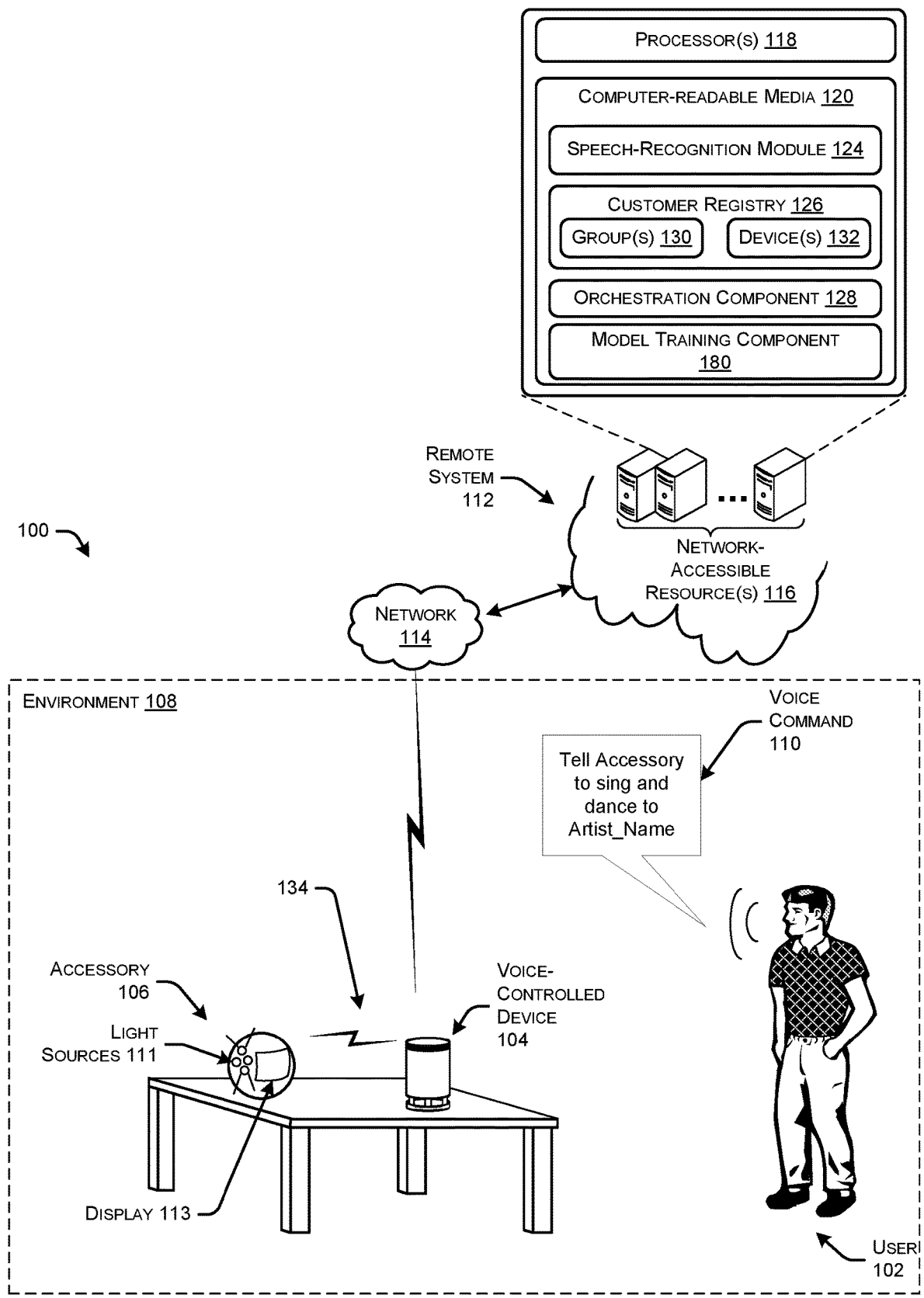
FIG. 1 is a conceptual diagram of an illustrative environment in which a user utilizes a voice-controlled device to control one or more accessory devices.

This disclosure is directed to systems, devices, and techniques pertaining to coordinated operation of a voice-controlled device and one or more accessory devices in an environment. An environment may include at least one voice-controlled device and one or more accessory devices. The "voice-controlled device" is configured to receive voice commands from a user in the environment, and to cause performance of operations via the voice-controlled devices and/or the one or more accessory devices in the environment. In order to accomplish this, the voice-controlled device is coupled, via a computer network(s), to a remote system that comprises a speech recognition platform used to process audio data received from the voice-controlled device, and to send information and instructions to the voice-controlled device and/or the one or more accessory devices in the environment. The information and instructions, upon receipt and subsequent processing at the voice-controlled device and the one or more accessory devices, cause coordinated operation of the voice-controlled device and the one or more accessory devices.

As an illustrative example, a user in the environment can ask (by uttering a voice command) the voice-controlled device to cause the accessory device to sing along to music, as the music is output by the voice-controlled device. In this example, the user may utter the following voice command: "Tell Accessory_Device to sing to music by Artist_Name." The voice-controlled device in the environment may capture, via a microphone(s), sound in the environment that corresponds to the uttered voice command, generate audio data based on the captured sound, and send the audio data to a remote system that processes the audio data through a speech recognition platform.

The speech recognition platform is configured to perform automatic speech recognition (ASR) on the audio data to generate text data corresponding to the audio data. ASR is a field of computer science, artificial intelligence, and linguistics concerned with transforming audio data associated with speech into text representative of that speech. The ASR text data can be processed through a natural language understanding (NLU) system. NLU is a field of computer science, artificial intelligence, and linguistics concerned with enabling computers to derive meaning from text input containing natural language. ASR and NLU are often used together as part of a speech processing system. Here, the ASR/NLU systems are used to identify, in some instances, multiple domains of the NLU system, and multiple intents associated with the multiple domains. For example, the speech recognition platform, via the NLU system, may identify a first intent associated with a first domain. Continuing with the above example, the first intent may comprise a "play music" intent, and the first domain may comprise a "music" domain based on the following ASR text data: "music by Artist_Name." That is, the speech recognition platform can determine that the user wants a device in the environment, such as the voice-controlled device, to playback a song by Artist_Name, and accordingly, the speech recognition platform identifies the music domain and the play music intent to fulfill this request.

The NLU system may also identify a second intent associated with a second domain based on the ASR text data. In the above example, the second intent may comprise a "lip synch" intent, and the second domain may comprise a "lip synch" domain based on the following ASR text data: "Tell Accessory_Device to sing." That is, the speech recognition platform can determine that the user wants the accessory device in the environment to lip synch to the words of the song by Artist_Name as the song is played back by the voice-controlled device.

The NLU system may also identify a named entity within the ASR text data, such as "Artist_Name" (a fictitious performing artist used throughout this disclosure merely for exemplary purposes). The named entity identified from the ASR text data may be one of a plurality of named entities associated with the music domain. As such, the named entity can be used to determine main content (e.g., audio content) associated with the voice command.

With the named entity and at least two intents identified, the remote system can send information and instructions to the voice-controlled device and the one or more accessory devices in the environment in order to cause the coordinated operation of the devices, as requested by the user. For example, the remote system can send, to the voice-controlled device, first information about a first storage location where main content associated with the named entity is stored. The first information can comprise a uniform resource locator (URL) or any similar information for accessing the main content. In the above example, the main content can comprise audio content in the form of a song by Artist_Name. The remote system can also send, to the voice-controlled device, a first instruction corresponding to the first intent. In the above example, the first intent is a play music intent, and the first instruction for the play music intent may cause the voice-controlled device to access the main content (e.g., the audio content comprised of the song) and to begin outputting the main content at a time specified in the first instruction. Thus, the voice-controlled device, upon processing of the first instruction, is configured to begin playing back the song by Artist_Name at the time specified in the first instruction.

The remote system can also send, to the accessory device in the environment, second information about a second storage location where control information associated with the main content or supplemental content associated with the main content is stored. The second information can comprise a URL or any similar information for accessing the control information or the supplemental content. In the above example, based on the user's request to "Tell Accessory_Device to sing," the second information can point to control information comprising at least viseme information. The remote system can also send, to the accessory device, a second instruction corresponding to the second intent. In the above example, the second intent is a lip synch intent, and the second instruction for the lip synch intent may cause the accessory device to access the control information comprising at least the viseme information and to begin processing the control information at the time specified in the second instruction. The viseme information can cause a movable mouth of the accessory device to operate in coordination with words in the song, as the words are output via the speaker(s) of the voice-controlled device. Additionally, or alternatively, the viseme information can cause presentation of mouth-related animations on a display of the accessory device in coordination with the words in the song, as the words are output via the speaker(s) of the voice-controlled device. Thus, the accessory device can begin processing the control information at the time specified in the second instruction to synchronize mouth movements (either via a movable member or via digitized animations on a display) with the words in the audio content, as the audio content is output via the voice-controlled device. In order to synchronize local clocks on the respective devices, the voice-controlled device may send time synchronization information to the accessory device to ensure that the processing of the control information begins at approximately the same time as the output of the main content via the voice-controlled device.

For purposes of discussion, examples are used herein primarily for illustrative purposes. For example, the techniques described herein are often described with reference to playback of audio content comprising music. However, it is to be appreciated that the techniques and systems described herein may be implemented with any suitable audio content, such as audio books, podcasts, short stories, or any suitable audio content. Where displays are employed, content can also comprise visual content, such as a movie, music video, graphics, animations, and so on. Accordingly, "content" as used herein can comprise any suitable type of content, including multimedia content.

FIG. 1 is an illustration of an example system architecture 100 in which a user 102 utilizes a voice-controlled device 104 to control one or more accessory devices. FIG. 1 shows an accessory device 106 in the form of a spherical toy. FIG. 1 is provided to aid in comprehension of the disclosed techniques and systems. As such, it should be understood that the discussion that follows is non-limiting.

Within FIG. 1, the user 102 may interact with one or more accessory devices 106 within an environment 108 by uttering voice commands that are directed to the voice-controlled device 104 in the environment 108. For instance, if the user 102 would like to have the accessory 106 "dance" and "sing" to music that is output via the voice-controlled device 104 and/or via the accessory 106, the user 102 may issue a voice command to the voice-controlled device 104 to "Tell Accessory_Device to sing and dance to Artist_Name." Multiple other voice commands are possible, such as "Tell Accessory_Device to play a game," or, in the case of multiple accessory devices 106 in the environment 108, "tell my Accessories to dance together to Artist_Name," or the like. In each case, the voice-controlled device 104 may interact with a remote system, discussed below, to cause the accessory device 106 to perform the requested operation. For instance, the accessory device 106 may receive a stream of control information along with an instruction (or command) to begin processing the stream of control information at a time specified in the instruction. Processing of the control information by the accessory device 106 may cause the accessory device 106 to operate in a mode of operation among multiple available modes of operation, and/or cause operation of a component(s) of the accessory device 106, such as components including, without limitation, individual light sources of a plurality of light sources 111, a display 113, a movable member (e.g., a movable mouth or another appendage of an animatronic version of the accessory device 106, etc.), and the like.

In this example, however, the user 102 wishes to have the accessory 106 "sing" and "dance" to music by operating light sources 111 (e.g., light emitting diodes (LEDs)) and presenting lip synch animations on the display 113. Accordingly, the user 102 speaks a natural language command 110, such as "Tell Accessory_Device to sing and dance to Artist_Name." The sound waves corresponding to the natural language command 110 may be captured by one or more microphone(s) of the voice-controlled device 104. In some implementations, the voice-controlled device 104 may process the captured signal. In other implementations, some or all of the processing of the sound may be performed by additional computing devices (e.g. servers) connected to the voice-controlled device 104 over one or more networks. For instance, in some cases the voice-controlled device 104 is configured to identify a predefined "wake word" (i.e., a predefined utterance). Upon identifying the wake word, the device 104 may begin uploading an audio signal generated by the device to the remote servers for performing speech recognition thereon, as described in further detail below.

FIG. 1 illustrates that the voice-controlled device 104 may couple with a remote system 112 over a network 114. The network 114 may represent an array or wired networks, wireless networks (e.g., WiFi), or combinations thereof. The remote system 112 may generally refer to a network-accessible platform—or "cloud-based service"—implemented as a computing infrastructure of processors, storage, software, data access, and so forth that is maintained and accessible via the network 114, such as the Internet. Cloud-based services may not require end-user knowledge of the physical location and configuration of the system that delivers the services. Common expressions associated with cloud-based services, such as the remote system 112, include "on-demand computing", "software as a service (SaaS)", "platform computing", "network accessible platform", and so forth.

As illustrated, the remote system 112 may comprise one or more network-accessible resources 116, such as servers. Multiple such resources 116 may be included in the system 112 for training ASR models, one server(s) for performing ASR, one resource/device 116 for performing NLU, etc. These resources 116 comprise one or more processors 118, which may include a central processing unit (CPU) for processing data and computer-readable instructions, and computer-readable storage media 120 storing the computer-readable instructions that are executable on the processors 118. The computer-readable media 120 may individually include volatile random access memory (RAM), non-volatile read only memory (ROM), non-volatile magnetoresistive (MRAM) and/or other types of memory, and may store a speech-recognition module 124, a customer registry 126, and an orchestration component 128, a model training component 180, and/or other data and computer-executable instructions. The model training component 180 may be used to train the classifier(s)/machine learning models discussed below. The computer-readable media 120 may individually include one or more non-volatile storage types such as magnetic storage, optical storage, solid-state storage, etc. The resources 116 may also be connected to removable or external non-volatile memory and/or storage (such as a removable memory card, memory key drive, networked storage, etc.) through respective input/output device interfaces.

Computer instructions for operating the resource 116 and its various components may be executed by the processor(s) 118, using the computer-readable media 120 as temporary "working" storage at runtime. A resource's 116 computer instructions may be stored in a non-transitory manner in non-volatile memory, storage, or an external device(s), and computer-readable media 120 can represent some or all of these memory resources. Alternatively, some or all of the executable instructions may be embedded in hardware or firmware on the respective device in addition to or instead of software.

Each resource 116 can include input/output device interfaces. A variety of components may be connected through the input/output device interfaces. Additionally, the resource (s) 116 may include an address/data bus for conveying data among components of the respective device. Each component within resource 116 may also be directly connected to other components in addition to (or instead of) being connected to other components across the bus.

Upon the device 104 identifying the user 102 speaking the predefined wake word (in some instances), the device 104 may begin uploading audio data—the audio data representing sound captured by a microphone(s) of the device 104 within the environment 108—up to the remote system 112 over the network 114. In response to receiving this audio data, the speech-recognition module 124 (part of a speech recognition platform) may begin performing ASR on the audio data to generate text data and identify, using NLU, one or more user voice commands from the generated text data.

Accordingly, upon receiving the audio data from the voice-controlled device 104, the speech-recognition module 124 may perform ASR on the audio data to generate text data. The text data may then be processed by an NLU module to identify a domain(s) and an intent(s). In some instances, the text data generated from the audio data will indicate multiple intents and multiple corresponding domains, as will be described in more detail below. In the example of FIG. 1, the user utters "Tell Accessory_Device to sing and dance to Artist_Name." Thus, a first intent identified by the NLU module can comprise a "play music" intent, which can be deduced based on recognizing "Artist_Name" as an artist (a type of named entity) associated with the music domain. A second intent identified by the NLU module can comprise a "lip synch" intent, which can be deduced based on the text data "Tell Accessory_Device to sing." In this example, a third intent can be identified by the NLU module comprising a "dance along" intent, which can be deduced based on the text data "Tell Accessory_Device to . . . dance." In some embodiments, the text "sing and dance" may implicate a single, accessory-related intent, rather than multiple different intents. It is to be appreciated that many different utterances can implicate multiple intents and multiple corresponding domains. For instance, the user 102 can utter "Tell Accessory_Device to dance to Song_Name," without mentioning an artist name, or "Tell Accessory_Device to dance to Music_Genre," without mentioning an artist name or a song name.

NLU can also be used to identify one or more named entities from the ASR text data. In the example of FIG. 1, at least one named entity is "Artist_Name," which in this case, is an artist associated with the music domain. The named entity may be used to identify the music domain and the "play music" intent, as well as to identify audio content (e.g., a song) associated with the named entity. Furthermore, the NLU module can identify other named entities, such as an accessory 106 (or group of accessories) to which the command applies ("Accessory"). The orchestration component 128 may then attempt to identify the accessory devices registered to the user 102 associated with the named entity "Accessory" in the natural language voice command 110. It is to be appreciated that a named entity can be identified based on explicitly spoken named entities in the utterance, without the use of further information to identify the named entity. Thus, the artist can be identified from the user's 102 utterance of "Artist_Name", and the accessory 106 can be identified from the user's 102 utterance of "Accessory", in the voice command 110 of FIG. 1.

Additionally, or alternatively, identifying information can be utilized to aid in the identification of named entities that are explicitly mentioned in the utterance, or to identify named entities by inference when the named entities are not mentioned in the utterance. Such identifying information can be included within metadata that is sent along with the audio data to the remote system 112. For example, the device 104 may send an identifier associated with the device 104 and/or the user 102 when, or approximately when, the device 104 uploads the audio data to the remote system 112. An identifier associated with the device 104 can include, without limitation, a MAC address, IP address, or other device identifier (DID) identifying the device 104. An identifier associated with the user 102 can include, without limitation, an email address of the user 102, a username of the user 102, or the like. Additionally, or alternatively, identifying information can be extracted from the audio data that is sent to the remote system 112, such as a voice fingerprint of the user 102 that can be extracted from the audio data itself.

Using this information, the orchestration component 128 may identify a set of one or more accessory devices 132 that have been registered to the user 102 and/or have been registered as residing with the environment 108 within the customer registry 126. In addition, the orchestration component 128 may utilize a verbal description (i.e., the named entity identified by the NLU module) of the referenced accessory device 106 to determine the accessory device(s) 132 referenced in the natural-language command 110. Here, the user 102 may have initially provided an indication to the remote system 112 that the illustrated accessory 106 is to be named "Accessory," or a different name, such as "Bob." Therefore, having identified the verbal description of the accessory device 106 referenced in the voice command 110, the orchestration component 128 may map these verbal descriptions to devices 132 indicated in the customer registry 126 as being associated with the user 102. Thus, in the example of FIG. 1, the orchestration component 128 may analyze groups 130 and/or the devices 132 to determine whether a group or device entitled "Accessory" exists.

After identifying the accessory device(s) 106 that are to "sing" and "dance" in accordance with the voice command 110 of the user 102, the orchestration component 128 may determine where content relating to the voice command 110 is located/stored, and, in some instances, may determine where control information to be processed by the accessory device 106 is stored. Control information may include, without limitation, viseme information, dance information, and similar information that, when processed by the accessory device 106, causes a component(s) of the accessory device 106 to operate in coordination with main content as the main content is output via the voice-controlled device 104. If control information is not already in existence and accessible to the accessory device 106, the orchestration component 128 may be configured to generate control information (e.g., viseme information, dance information, etc.) "on-the-fly" using the main content. Once generated, the orchestration component 128 can store the control information in a network-accessible storage location for the accessory device 106 (and/or the voice-controlled device 104) to access over the network 114.

The orchestration component 128 may send information and instructions over the network 114 to the voice-controlled device 104 and the accessory device 106. For example, the orchestration component 128 can send to the voice-controlled device 104 first information (e.g., a first URL) for accessing main content associated with the named entity identified by the NLU module based on the ASR text data. In the example of FIG. 1, a named entity identified from the ASR text data is "Artist_Name," which the orchestration component 128 identifies as an artist associated with the music domain. Accordingly, audio content in the form of a song by Artist_Name can be located, and the first information can be sent to the voice-controlled device 104 so that the voice-controlled device 104 can access (e.g., stream or download) the audio content using the first information (e.g., a URL to an audio file corresponding to the song).

The orchestration component 128 can also send a first instruction to the voice-controlled device 104 to initiate playback of the main content (e.g., audio content) via the voice-controlled device 104 at a time specified in the first instruction. In the above example, the first instruction may cause the voice-controlled device 104 to access audio content corresponding to a song by Artist_Name using the first information and to begin outputting audio of the song via a speaker(s) of the voice controlled device 104.

The orchestration component 128 can send to the accessory device 106 second information (e.g., a second URL) for accessing control information associated with the main content and/or supplemental content associated with the main content. In the example of FIG. 1, the main content comprises audio content in the form of a song by Artist_Name. Thus, in order to cause the accessory device 106 to "sing and dance" to the audio content, control information including viseme information and dance information can be located (or generated and stored in a network-accessible storage location), and second information can be sent to the accessory device 106 so that the accessory device 106 can access the control information using the second information (e.g., a URL to the control information including the viseme information and the dance information for the song by Artist_Name). In some embodiments, this information can be sent to the voice-controlled device 104, and the control information can be accessed by the voice-controlled device 104 and forwarded to the accessory device 106 via a wireless communication channel 134 between the devices 104 and 106. For example, the control information can be forwarded over a short range wireless connection (e.g., Bluetooth), or via a wireless access point in the environment 108, or any other suitable means of transmitting information/data between the devices 104 and 106.

The orchestration component 128 can also send a second instruction to the accessory device 106 to begin processing the control information or to begin playback of the supplemental content (e.g., video content) via the accessory device 106 at the time specified in the second instruction that corresponds to a time when the voice-controlled device 104 is instructed to begin playback of the main content (e.g., audio content). In the example of FIG. 1, the second instruction may cause the accessory device 104 to access the control information using the second information and to begin processing the stream of control information to control operation of a component of the accessory device 106 in coordination with the output of the main content via the voice-controlled device 104. For example, viseme information in the control information may include a series of timestamped mouth movements (or mouth movement instructions) that cause a movable mouth of the accessory device 106 to move in a synchronous manner with the words in the audio content, as the audio content is output via the speaker(s) of the voice-controlled device 104. Additionally or alternatively, the viseme information may cause presentation of mouth-related animations on the display 113 of the accessory device 106 in coordination with the words in the audio content, as the audio content is output via the speaker(s) of the voice-controlled device 104.

In order to make the accessory device 106 "dance" along with the main audio content in the example of FIG. 1, dance information in the control information may include a series of timestamped dance movements (or dance movement instructions) that cause either a movable member (e.g., an appendage of an animatronic version of the accessory device 106) or individual lights 111 (or particular groups of lights 111) of the accessory device 106 to operate in coordination with a beat signature of the main audio content, as the audio content is output via the speaker(s) of the voice-controlled device 104. Additionally or alternatively, the dance information may cause presentation of dance-related animations on the display 113 of the accessory device 106 in coordination with the beat signature of the audio content, as the audio content is output via the speaker(s) of the voice-controlled device 104. It is to be appreciated that the instructions that are sent to the devices 104 and 106 in the environment 108 can comprise commands associated with device drivers, which may represent executable programs that operate and/or control a particular type of device or a particular component of the device. That is, a device driver for a particular device (e.g., the "accessory device 106") may provide a software interface for the accessory device 106. Because such device drivers are sometimes hardware-dependent (e.g., a driver may be used to actuate a movable member of the accessory 106), such devices 106 often use custom drivers.

Accordingly, in response to receiving the information for accessing content and/or control information and the instructions pertaining to when to output such content or process such control information, accessory drivers (which may reside on the voice-controlled device 104, the accessory device(s) 106, at the remote system 112 (as illustrated), or otherwise) may execute the control information and cause the accessory 106 to operate in coordination with main content, as the main content is output via the voice-controlled device 104. As noted above, the operation of a component(s) of the accessory device 106 may involve the operation of individual light sources 111 of the accessory 106 in order to "dance" to the beat of music being output via the voice-controlled device 104, operation of a movable member (e.g., a movable mouth, appendage, etc.) to dance along to the beat of the music or sing along with the words in the music, and/or to present visual content (e.g., animations, such as mouth-related or dance-related animations) on the display 113. Supplemental content output on the display 113 of the accessory device 106 may comprise video content, such as a music video that is associated with a song being output via the speaker(s) of the voice-controlled device 104, or any similar content that is associated with the main content output via the device 104.

In the illustrative example of FIG. 1, in response to the voice command 110, the voice-controlled device 104 may play an audio file (e.g., a song by the artist "Artist_Name") via its own speaker(s) or cause the audio file to be output via speaker(s) of the accessory 106, and the accessory 106 can receive control information from the voice-controlled device 104 via the wireless communication channel 134 or directly from the network 114. The control information enables the accessory 106 to perform operations in time synchronization with the audio of the audio file that is being output via the speaker(s) of the voice-controlled device 104 and/or the accessory 106. For instance, the control information can include a stream of information that tells the accessory 106 how to operate a particular component of the accessory 106 over the course of time. For example, the control information can comprise information about which individual light sources 111 (or groups of light sources 111) to turn on and off at particular times over the course of a time period that corresponds to the time period of the audio file (e.g., the song) being output at the same time, or even times at which the light output of the light sources 111 is to be dimmed or intensified. The control information can also comprise information about which digital animations (e.g., mouth movements, a body performing dance movements, etc.) to present on the display 113 at particular times over the course of the time period. The control information can also comprise information about how to control movable members of the accessory 106, such as a movable mouth, or a movable appendage of an animatronic accessory device 106. Thus, the control information can include, without limitation, viseme information that is mapped to words in the audio file in order to present lip animations on the display 113, or in order to operate a movable mouth of an animatronic accessory device 106, in synch with the words of the audio file being output via a speaker of the voice-controlled device 104 and/or the accessory 106. The control information can further include, without limitation, dance information that tells the accessory 106, for example, when to operate the light sources 111 (or other components of the accessory 106) in synch with the beat signature of the audio file, or how and when to move a movable member (e.g., an appendage) of the accessory 106 in synch with the beat signature of the audio file.

Figure 2:
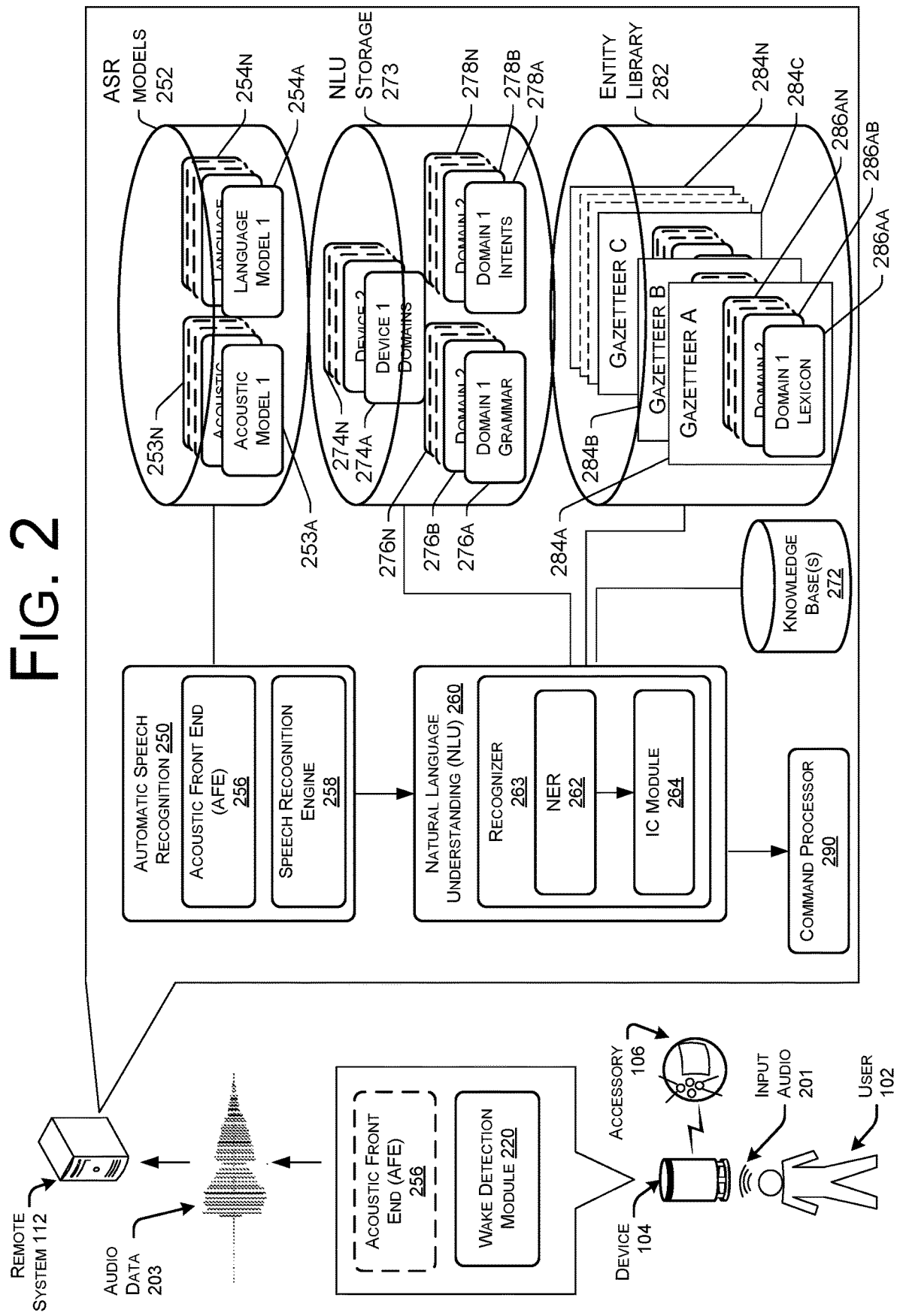
FIG. 2 is a conceptual diagram of components of a speech processing system according to embodiments of the present disclosure.

FIG. 2 is a conceptual diagram of how a spoken utterance can be processed, allowing a system to capture and execute commands spoken by a user 102, such as spoken commands that may follow a wakeword. The various components illustrated may be located on a same or different physical devices. Communication between various components illustrated in FIG. 2 may occur directly or across a network 114. An audio capture component, such as a microphone of device 104, captures audio 201 corresponding to a spoken utterance. The device 104, using a wakeword detection module 220, then processes the audio 201, or audio data corresponding to the audio 201, to determine if a keyword (such as a wakeword) is detected in the audio 201. Following detection of a wakeword, the device 104 sends audio data 203 corresponding to the utterance, to a computing device of the remote system 112 that includes an ASR module 250. The audio data 203 may be output from an acoustic front end (AFE) 256 located on the device 104 prior to transmission. Or the audio data 203 may be in a different form for processing by a remote AFE 256, such as the AFE 256 located with the ASR module 250.

The wakeword detection module 220 works in conjunction with other components of the device 104, for example a microphone to detect keywords in audio 201. For example, the device 104 may convert audio 201 into audio data, and process the audio data with the wakeword detection module 220 to determine whether speech is detected, and if speech is detected, if the audio data comprising speech matches an audio signature and/or model corresponding to a particular keyword.

The device 104 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 201 received by the device 104 (or separately from speech detection), the device 104 may use the wakeword detection module 220 to perform wakeword detection to determine when a user 102 intends to speak a command to the device 104. This process may also be referred to as keyword detection, with the wakeword being a specific example of a keyword. Specifically, keyword detection may be performed without performing linguistic analysis, textual analysis or semantic analysis. Instead, incoming audio 201 (or audio data) is analyzed to determine if specific characteristics of the audio match preconfigured acoustic waveforms, audio signatures, or other data to determine if the incoming audio "matches" stored audio data corresponding to a keyword. The wakeword detection module 220 receives captured audio 201 and processes the audio 201 to determine whether the audio corresponds to particular keywords recognizable by the device 104 and/or remote system 112. Stored data relating to keywords and functions may be accessed to enable the wakeword detection module 220 to perform the algorithms and methods described herein. The speech models stored locally on the device 104 may be pre-configured based on known information, prior to the device 104 being configured to access the network by the user 102. For example, the models may be language and/or accent specific to a region where the user device 104 is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 104 prior to the user device 104 being delivered to the user or configured to access the network by the user. The wakeword detection module 220 may access the storage 408 and compare the captured audio to the stored models and audio sequences using audio comparison, pattern recognition, keyword spotting, audio signature, and/or other audio processing techniques.

Thus, the wakeword detection module 220 may compare audio data to stored models or data to detect a wakeword. One approach for wakeword detection applies general large vocabulary continuous speech recognition (LVCSR) systems to decode the audio data, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 104 may "wake" and begin transmitting audio data 203 corresponding to input audio 201 to the remote system 112 for speech processing. Audio data corresponding to that audio may be sent to a remote system 112 for routing to a recipient device or may be sent to the server for speech processing for interpretation of the included speech (either for purposes of enabling voice-communications and/or for purposes of executing a command in the speech). The audio data 203 may include data corresponding to the wakeword, or the portion of the audio data corresponding to the wakeword may be removed by the local device 104 prior to sending. Further, a local device 104 may "wake" upon detection of speech/spoken audio above a threshold, as described herein. Upon receipt by the remote system 112, an ASR module 250 may convert the audio data 203 into text data (or generate text data corresponding to the audio data 203). The ASR transcribes audio data 203 into text data representing the words of the speech contained in the audio data 203. The text data may then be used by other components for various purposes, such as executing system commands, inputting data, etc. A spoken utterance in the audio data 203 is input to a processor configured to perform ASR which then interprets the utterance based on the similarity between the utterance and pre-established language models 254 stored in an ASR model knowledge base (ASR Models Storage 252). For example, the ASR process may compare the input audio data 203 with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine 258. The speech recognition engine 258 compares the speech recognition data with acoustic models 253, language models 254, and other data models and information for recognizing the speech conveyed in the audio data. The AFE 256 may reduce noise in the audio data 203 and divide the digitized audio data 203 into frames representing a time intervals for which the AFE 256 determines a number of values, called features, representing the qualities of the audio data 203, along with a set of those values, called a feature vector, representing the features/qualities of the audio data 203 within the frame. Many different features may be determined, as known in the art, and each feature represents some quality of the audio data 203 that may be useful for ASR processing. A number of approaches may be used by the AFE 256 to process the audio data 203, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE 256. For example, the device 104 may process audio data into feature vectors (for example using an on-device AFE 256) and transmit that information to a server across a network 114 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR result(s) (or speech recognition result(s)) may be sent by the speech recognition engine 258 to other processing components, which may be local to the device performing ASR and/or distributed across the network(s) 114. For example, ASR results in the form of a single textual representation of the speech, an N-best list including multiple hypotheses and respective scores, lattice, etc. may be sent to a server, such as remote system 112, for natural language understanding (NLU) processing, such as conversion of the speech recognition result(s) (e.g., text data) into commands for execution, either by the device 104, by the remote system 112, by the accessory 106, or by another device (such as a server running a specific application like a search engine, etc.).

The device performing NLU processing 260 (e.g., remote system 112) may include various components, including potentially dedicated processor(s), memory, storage, etc. As shown in FIG. 2, an NLU component 260 may include a recognizer 263 that includes a named entity recognition (NER) module 262 which is used to identify portions of query text that correspond to a named entity that may be recognizable by the system. A downstream process called named entity resolution actually links a text portion to an actual specific entity known to the system. To perform named entity resolution, the system may utilize gazetteer information (284a-284n) stored in entity library storage 282. The gazetteer information may be used for entity resolution, for example matching ASR results (e.g., text data) with different entities (such as song titles, artist names, contact names, device names (e.g., natural language names for devices 104 and 106), etc.) Gazetteers may be linked to users (for example a particular gazetteer may be associated with a specific user's 102 music collection), may be linked to certain domains (such as music, shopping, etc.), or may be organized in a variety of other ways.

Generally, the NLU process takes textual input (such as processed from ASR 250 based on the utterance input audio 201) and attempts to make a semantic interpretation of the text data. That is, the NLU process determines the meaning behind the text data based on the individual words and then implements that meaning. NLU processing 260 interprets a text string to derive an intent (or a desired action from the user) as well as the pertinent pieces of information in the text data that allow a device (e.g., device 104) to complete that action. For example, if a spoken utterance is processed using ASR 250 and outputs the text data "Tell Accessory_Device to sing Artist_Name" the NLU process may determine that the user 102 intended to activate the lip-synch mode for an accessory device 106 with the name "Accessory," and the NLU process may identify multiple intents from this single spoken utterance to control operation of multiple devices, such as the device 104 and the accessory device 106, as described below.

The NLU may process several textual inputs related to the same utterance. For example, if the ASR 250 outputs N text segments (as part of an N-best list), the NLU 260 may process all N outputs to obtain NLU results.

As will be discussed further below, the NLU process may be configured to parse, tag, and annotate text as part of NLU processing. For example, the text data "Tell Accessory_Device to sing Artist_Name" may be parsed into words, and the word "sing" may be tagged as a command (to operate the accessory 106 in lip synch mode) and "Accessory" and "Artist_Name" may each be tagged as a specific entity associated with the command. Further, the NLU process may be used to provide answer data in response to queries, for example using the knowledge base 272.

To correctly perform NLU processing of speech input, an NLU system 260 may be configured to determine a "domain(s)" of the utterance so as to determine and narrow down which services offered by the endpoint device (e.g., remote system 112 or device 104) may be relevant.

The NLU module 260 receives a query in the form of ASR results and attempts to identify relevant grammars and lexical information that may be used to construe meaning. To do so, the NLU module 260 may begin by identifying potential domains that may relate to the received query. The NLU storage 273 includes a databases of devices (274a-274n) identifying domains associated with specific devices. For example, the device 104 may be associated with domains for music, telephony, calendaring, contact lists, and device-specific communications, but not video. The accessory device 106 may be associated with a domain for lip synching, dancing along, playing games, telling stories, and the like. Thus, at least some of the device domains 274a-274n may correspond to one or more "accessory-related" domains corresponding to one or more accessory devices 106, as described herein. In addition, the entity library 282 may include database entries about specific services on a specific device, either indexed by Device ID, User ID, or Household ID, or some other indicator.

In NLU processing, a domain may represent a discrete set of activities having a common theme, and a user may request performance such activities by providing speech to a voice-controlled device 104. For instance, example domains may include, without limitation, domains for "shopping", "music", "calendaring", "reminder setting", "travel reservations", "to-do list creation", etc. Domains specific to the accessory device ICE may include, without limitation, a "lip synch" domain, a "dance along" domain, a "messaging" domain, a "game" domain, and the like. As such, each domain may be associated with a particular recognizer 263, language model and/or grammar database (276a-276n), a particular set of intents/actions (278a-278n), and a particular personalized lexicon (286aa-286an). Each gazetteer (284a-284n) may include domain-indexed lexical information associated with a particular user and/or device. For example, the Gazetteer A (284a) includes domain-index lexical information 286aa to 286an. A user's music-domain lexical information might include named entities such as album titles, artist names, and song names, for example, whereas a user's contact-list lexical information might include named entities such as the names of contacts. Since every user's music collection and contact list is presumably different, this personalized information improves entity resolution (i.e., identification of named entities from spoken utterances).

As noted above, in NLU processing, a query may be processed applying the rules, models, and information applicable to each identified domain. For example, if a query potentially implicates both an accessory-related domain (e.g., a "lip synch" domain, a "dance along" domain, etc.) and a music domain, the query may, substantially in parallel, be NLU processed using the grammar models and lexical information for the accessory-related domain (e.g., lip synch), and will be processed using the grammar models and lexical information for the music domain. When only a single domain is implicated by the received query, the responses based on the query produced by each set of models can be scored, with the overall highest ranked result from all applied domains selected to be the most relevant result. In other words, the NLU processing may involve sending the query (or ASR text data) to each available domain, and each domain may return a score (e.g., confidence) that the domain can service a request based on the query, the highest ranking score being selected as the most relevant result. For domains with equivalent scores, the NLU system 260 may determine the device 104 that sent the audio data 203 as a means for selecting one domain over the other. For example, if the device 104 does not include a display, a music domain may be selected over a video domain when the domain scores are otherwise equivalent. Alternatively, if the device 104 is primarily used as a display device for presenting video content, the video domain may be selected over the music domain when the domain scores are otherwise equivalent.

A single text query (based on a single utterance spoken by the user 102) may, in some instances, implicate multiple domains, and some domains may be functionally linked (e.g., both a music domain and an accessory-related domain, such as the lip synch domain or the dance along domain, may be functionally linked such that the accessory-related domain is implicated when the music player service is also implicated). The determination to implicate multiple domains from a single text query may be performed in a variety of ways.

In some embodiments, the determination to implicate multiple domains may be based at least in part on metadata that indicates the presence of an accessory device 106 in the environment 108 with voice-controlled device 104. Such metadata can be sent from the voice-controlled device 104 to the remote system 112, and may be used by the NLU system 260 to determine whether to implicate multiple domains or a single domain. If, based on the metadata, it is determined that an accessory device 106 is present in the environment 108 with the voice-controlled device 104, the NLU system 260 may select an additional accessory-related domain, such as the lip synch domain, or the dance along domain, in order to control the operation of the accessory device 106 in coordination with music, as the music is audibly output via a speaker(s) of the voice-controlled device 104. This may be a default behavior that is invoked any time the user 102 requests the device 104 to play music (or any other suitable audio content), which may be changed in user settings pursuant to user preferences. In an example, the metadata can include an identifier of the voice-controlled device 104. This metadata may be sent to the remote system 112 along with the audio data 203, and upon receipt of such audio data 203 and metadata (e.g., a identifier of the device 104), the NLU system 260 may initially determine, based on the audio data 203, that the music domain is implicated by the spoken utterance "play Artist_Name." The NLU system 260 may further utilize the metadata (e.g., the identifier of the device 104) to access a user profile (e.g., the customer registry 126) associated with the voice-controlled device 104. In this manner, the NLU system 260 can determine whether any accessory devices 106 are associated with the user profile and/or the device 104 in question. In the examples of FIGS. 1 and 2, the NLU system 260 may determine that the accessory device 106 is associated with the user profile of the user 102. Furthermore, the NLU system 260 may attempt to determine an indication that the accessory 106 is in the environment 108 and powered on (or "online") so that the accessory 106 can be utilized in the manners described herein. For example, the user profile of the user 102 may be updated with information as to which accessories 106 in the environment 108 were "last seen" by the particular voice-controlled device 104. This may occur by pairing the voice-controlled device 104 with one or more accessories 106 in the environment 108, by detecting accessories in proximity to (i.e., within a threshold distance from) the voice-controlled device 104, and so on. The user profile of the user 102 can be dynamically updated with such "discovery" information as accessories 106 and voice-controlled devices 104 are moved around the environment 108, power cycled, and physically removed and brought within the environment 108.

In another example, metadata sent from the device 104 to the remote system 112 can include a device identifier of the accessory 106 that was obtained by the voice-controlled device 104. In this scenario, the voice-controlled device 104 may discover accessory devices 106 in the environment 108 prior to sending the audio data 203 to the remote system 112. Discovery of nearby accessory devices 106 can comprise determining that an accessory device(s) 106 are located anywhere in the environment 108 where the voice-controlled device 104 is located, determining that an accessory device(s) 106 is within a threshold distance from the voice-controlled device 104, and so on. Metadata in the form of an accessory 106 identifier can be used by the NLU system 260 to determine whether the accessory device(s) 106 is registered to the same user 102 to which the voice-controlled device 104 is registered. This may be accomplished by accessing a user profile of the user 102 that is accessible to the remote system 112. In some embodiments, the voice-controlled device 104 can determine whether an accessory 106 is within a threshold distance from the device 104 based on a signal strength measurement between the voice-controlled device 104 and the accessory, or based on any other suitable distance/range determination technique known in the art.

Another manner by which the NLU system 260 can determine whether to implicate multiple domains from a single text query is by using a heuristic, such as a threshold score that is returned by any two or more functionally linked domains in response to an input query. For example, ASR text data corresponding to the spoken utterance "Tell Accessory_Device to sing to Artist_Name" may be sent to both the music domain and an accessory-related domain, among other domains, and the music domain may return a score of 100 (on a scale from 0 to 100), while the lip synch domain returns a score of 99 on the same scale. The scores from the highest ranking domain (here, the music domain) and any other domains that are functionally linked to the highest ranking domain (e.g., the lip synch domain, if the lip synch domain is functionally linked to the music domain) can be compared to a threshold score, and if the multiple scores meet or exceed the threshold score, the multiple domains may be selected for servicing the single request to "Tell Accessory_Device to sing to Artist_Name," thereby causing the accessory device 106 to sing along to the words in a song by Artist_Name. An additional check may be carried out using the metadata, as described above, to determine that an accessory device 106 is registered to the user and/or associated with (e.g., last seen by) the voice-controlled device 104. This additional check may be performed prior to implicating the multiple domains to ensure that an accessory device 106 is online and available for enabling coordinated operation of the accessory 106 and the voice-controlled device 104. In yet another embodiment, the NLU system 260 can determine to implicate multiple domains when an accessory-related entity (i.e., a named entity associated with an accessory 106) is identified in the ASR text data. For example, if the ASR text data includes a named entity, such as "Accessory_Device," multiple domains can be implicated in response to such identification of an accessory-related entity in the ASR text data. Again, an additional check may be carried out using the metadata to verify that an accessory 106 is present in the environment 108 and otherwise online and available for coordinating the operation of the accessory 106 with the operation of the voice-controlled device 104.

An intent classification (IC) module 264 parses the query to determine an intent(s) for each identified/selected domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent, or may link words such as "sing," "mouth the words," and "lip synch" to a "lip synch" intent. The IC module 264 identifies potential intents for each identified domain by comparing words in the query to the words and phrases in the intents database 278. The determination of an intent by the IC module 264 is performed using a set of rules or templates that are processed against the incoming text data to identify a matching intent. In some cases, an implied intent can be identified when multiple domains are selected for servicing a single query, and when there are otherwise no words in the query that are linked to the implied intent. For example, when the user 102 utters "Play Artist_Name," and an accessory-related domain that is functionally linked to the music domain is selected for parallel processing of the query with both the music domain and the accessory-related domain, an implied intent for the accessory-related domain, such as a "lip synch" intent, can be identified, notwithstanding the fact that the user 102 did not say any words that are linked to the lip synch intent. In other embodiments, words linked to a first intent in a first domain may also be linked to a second intent in a second domain that is functionally linked (or otherwise associated with) the first domain. For instance, the word "play" can be linked to the "play music" intent in the music domain, and also to the "lip synch" intent in the lip synch domain (or an otherwise accessory-related domain).

In order to generate a particular interpreted response, the NER 262 applies the grammar models and lexical information associated with the respective domains to recognize one or more entities in the text of the query. In this manner the NER 262 identifies "slots" (i.e., particular words in query text) that may be needed for later command processing. Depending on the complexity of the NER 262, it may also label each slot with a type of varying levels of specificity (such as noun, place, city, artist name, song name, device name, or the like). Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. Each slot/field corresponds to a portion of the query text that the system believes corresponds to a named entity. For example, if "play music" is an identified intent, a grammar (276) framework or frameworks may correspond to sentence structures such as "Play {Artist_Name}," "Play {Album Name}," "Play {Song name}," "Play {Song name} by {Artist_Name}," etc. However, to make resolution more flexible, these frameworks would ordinarily not be structured as sentences, but rather based on associating slots with grammatical tags.

For example, the NER module 262 may parse the query to identify words as subject, object, verb, preposition, etc., based on grammar rules and/or models, prior to recognizing named entities. The identified verb may be used by the IC module 264 to identify an intent, which is then used by the NER module 262 to identify frameworks. A framework for an intent of "play" may specify a list of slots/fields applicable to play the identified "object" and any object modifier (e.g., a prepositional phrase), such as {Artist_Name}, {Album Name}, {Song name}, etc. The NER module 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "Tell Accessory_Device to sing to Song A by Artist_Name" might be parsed and tagged as {Object}: "Accessory," {Verb}: "sing," {Object}: "Song A," {Object Preposition}: "by," and {Object Modifier}: "Artist_Name." At this point in the process, "sing" is identified as a verb based on a word database associated with an accessory-related domain (e.g., the lip synch domain), which the IC module 264 will determine corresponds to the "lip synch" intent of the lip synch domain. The IC module 264 may also determine that the word "sing" also corresponds to an implied "play music" intent of the music domain. Here, the play music intent can be considered to be a first intent identified by the IC module 264, which is associated with a first domain; namely the music domain, while the lip synch intent can be considered to be a second intent identified by the IC module 264, which is associated with a second domain; namely the lip synch domain (or another accessory-related domain). Of course, any two or more domains and any two or more intents can be identified in a similar manner to the example domains and intents described herein. At this stage, no determination has been made as to the meaning of "Accessory," "Song A" and "Artist_Name," but based on grammar rules and models, it is determined that the text of these phrases relate to one or more grammatical objects (i.e., entities) of the query.

The frameworks linked to the intent are then used to determine what database fields should be searched to determine the meaning of these phrases, such as searching a user's gazette for similarity with the framework slots. So a framework for "play music" intent might indicate to attempt to resolve the identified object(s) based {Artist_Name}, {Album Name}, and {Song name}, and another framework for the same intent might indicate to attempt to resolve the object modifier based on {Artist Name}, and resolve the object based on {Album Name} and {Song Name} linked to the identified {Artist_Name}. Similarly, a framework for the "lip synch" intent might indicate to attempt to resolve the identified object(s) based on {Device Name}. If the search of the gazetteer does not resolve the slot/field using gazetteer information, the NER module 262 may search the database of generic words associated with the domain (in the knowledge base 272). So for instance, if the query was "play songs by the Artist_Name," after failing to determine an album name or song name called "songs" by "Artist_Name," the NER component 262 may search the domain vocabulary for the word "songs." In the alternative, generic words may be checked before the gazetteer information, or both may be tried, potentially producing two different results.

The results of NLU processing may be tagged to attribute meaning to the query. So, for instance, "Tell Accessory_Device to sing to song A by Artist_Name" might produce a result of: {first domain} Music and {second domain} lip synch, {first intent} Play Music and {second intent} lip synch, {artist name} "Artist_Name," {media type} SONG, and {song title} "Song A." As another example, "play songs by Artist_Name" might produce: {domain} Music, {intent} Play Music, {artist name} "Artist_Name," and {media type} SONG. Alternatively, as noted above, a default invocation of a second, functionally-linked domain may occur in response to the query "play songs by Artist_Name" if the user 102 prefers to have the accessory device 106 sing or dance along to music anytime the user 102 requests to play music, or any audio content for that matter.

The output data from the NLU processing (which may include tagged text, commands, etc.) may then be sent to a command processor 290, which may be located on a same or separate remote system 112. In some instances, the command processor 290 work in conjunction with one or more speechlets (or speechlet engines) that are configured to determine a response for the processed query, determine locations of relevant information for servicing a request from the user 102 and/or generate and store the information if it is not already created, as well as route the identified intents to the appropriate destination command processor 290. The destination command processor 290 may be determined based on the NLU output. For example, if the NLU output includes a command to play music (play music intent), the destination command processor 290 may be a music playing application, such as one located on device 104 or in a music playing appliance, configured to execute a music playing command. The command processor 290 for a music playing application (for the play music intent) may retrieve first information about a first storage location where audio content associated with the named entity is stored. For example, the music playing command processor 290 may retrieve a URL that is to be used by the device 104 to stream or download audio content corresponding to the named entity; in this example, music content by the fictitious performing artist "Artist_Name." The source (i.e., storage location) of the audio content may be part of the remote system 112, or may be part of a third party system that provides a service for accessing (e.g., streaming, downloading, etc.) audio content. If the NLU output includes a command to have the accessory device 106 dance along to the music played by the music playing application, the destination command processor 290 may include a dance along control application, such as one located on accessory device 106 or on a remote server of the system 112, configured to execute the dance along instruction, or any suitable "stream along" instruction that causes coordinated operation of the accessory device 106 and the device 104. For example, the accessory device 106 may include a display 113 whereupon supplemental content associated with the main audio content output by the device 104 is presented in a synchronized manner with the output of the main audio content by the device 104.

It is to be appreciated that the remote system 112 may utilize a first protocol to communicate, send, or otherwise transmit data and information to voice-controlled device(s) 104, and a second, different protocol to communicate, send, or otherwise transmit data and information to the accessory device(s) 106. One reason for this is that the accessory device 106 may not be configured to process speech, and the voice-controlled device 104 may be configured to process speech. As such, the remote system 112 can utilize a one-way communication channel to transmit data and information to the accessory device(s) 106 via the network(s) 114, while using a two-way communication channel to transmit data and information to, and receive data and information from, the voice-controlled device(s) 104. In an example, the remote system 112 can utilize a message processing and routing protocol, such as an Internet of Things (IoT), that supports Hypertext Transfer Protocol (HTTP), WebSockets, and/or MQ Telemetry Transport (MATT), among other protocols, for communicating data and information to the accessory device(s) 106.

The destination command processor 290 used to control the operation of the accessory device 106 in coordination with main content output by the device 104 may be configured to retrieve preconfigured control information (e.g., an already-created stream of viseme information, dance information, or the like), or the command processor can generate, either by itself or by invoking other applications and/or services, the control information that is ultimately sent to the accessory device 106 for enabling coordinated control of the accessory device 106 with the output of content by the device 104.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 260 during runtime operations where NLU operations are performed on text data (such as text output from an ASR component 250). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 263. Each recognizer 263 may include various NLU components such as an NER component 262, IC module 264 and other components such as an entity resolver, or other components.

For example, a music domain recognizer 263-A (first domain) may have an NER component 262-A that identifies what slots (i.e., portions of input text data) may correspond to particular words relevant to that domain. The words may correspond to entities such as (for the music domain) a performer, album name, song name, etc. An NER component 262 may use a machine learning model, such as a domain specific conditional random field (CRF) to both identify the portions corresponding to a named entity as well as identify what type of entity corresponds to the text portion. For example, for the text data "play songs by the stones," an NER 262-A trained for a music domain may recognize the portion of text [the stones] corresponds to a named entity and an artist name. The music domain recognizer 263-A may also have its own intent classification (IC) component 264-A that determines the intent of the text data assuming that the text data is within the proscribed domain. An IC component 264 may use a model, such as a domain specific maximum entropy classifier to identify the intent of the text data, where the intent is the action the user desires the system to perform.

Upon identification of multiple intents (e.g., a first intent associated with a first domain, and a second intent associated with a second domain), the command processors 290 invoked by the NLU system 260 can cause information and instructions to be sent to the devices 104 and 106 in the environment 108. For example, first information (e.g., a first URL or similar storage location information) can be sent over the network 114 to the voice-controlled device 104 to inform the device 104 of a first storage location where main content (e.g., audio content) associated with the named entity is stored, the first information being usable to access (e.g., stream or download) the main content. The command processor 290 can also cause a first instruction corresponding to the first intent to be sent to the voice-controlled device 104 which informs the device 104 as to a particular time (i.e., a time specified in the first instruction) to initiate playback of the main content. Another command processor 290 for the accessory device 106 can send second information (e.g., a second URL or similar storage location information) over the network 114 (either directly or routed through the device 104) to the accessory device 106 to inform the accessory device 106 of a second storage location where control information and/or supplemental content associated with the main content is stored, the second information being usable to access (e.g., stream or download) the control information and/or the supplemental content. The command processor 290 can also cause a second instruction corresponding to the second intent to be sent to the accessory device 106 which informs the accessory device 106 as to a particular time to begin processing the control information and/or the supplemental content. The control information, upon execution by the accessory device 106, may control the operation of a component(s) of the accessory device 106 (e.g., lights 111, the display 113, a movable member(s), etc.) in coordination with the output of the main content. For example, the control information may cause a movable mouth of the accessory device 106 to open/close along with the words of a song output by the speaker(s) of the device 104.

Multiple devices may be employed in a single speech processing system. In such a multi-device system, each of the devices may include different components for performing different aspects of the speech processing. The multiple devices may include overlapping components. The components of the devices 104 and remote resource 116 are exemplary, and may be located a stand-alone device or may be included, in whole or in part, as a component of a larger device or system.

Figure 3:
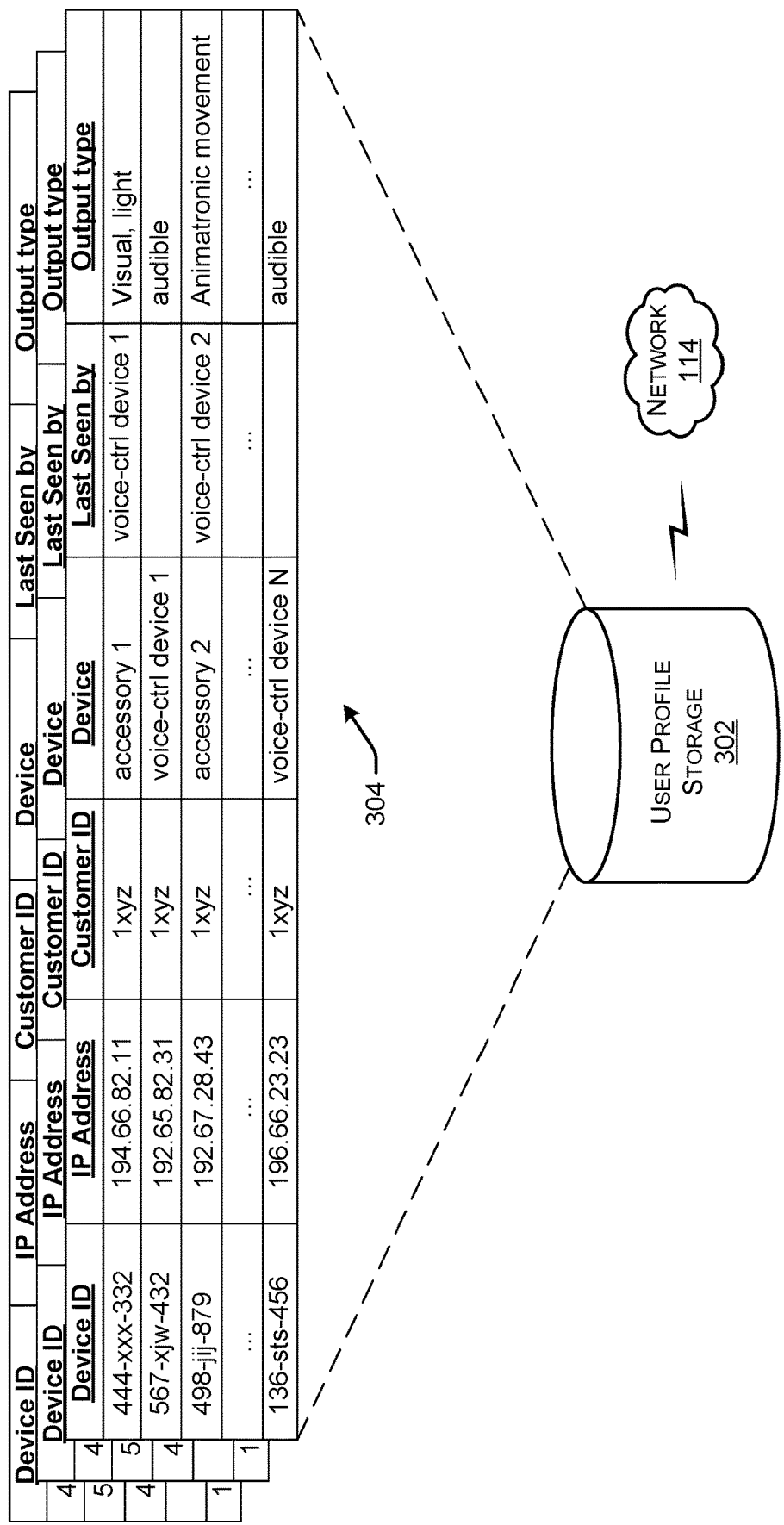
FIG. 3 illustrates a user profile storage that includes data regarding user profiles as described herein.

FIG. 3 illustrates a user profile storage 302 that includes data regarding user profiles 304 as described herein. The user profile storage 302 may be located part of, or proximate to, the remote system 112, or may otherwise be in communication with various components, for example over the network 114. The user profile storage 302 may include a variety of information related to individual users, accounts, etc. that interact with the device 104, the accessory 106, and the remote system 112. For illustration, as shown in FIG. 3, the user profile storage 302 may include data regarding the devices associated with particular individual user profiles 304. In an example, the user profile storage 302 is a cloud-based storage. Such data may include device identifier (ID) and internet protocol (IP) address information for different devices as well as names by which the devices may be referred to by a user. Further qualifiers describing the devices may also be listed along with a description of the type of object of the device.

A particular user profile 304 may include a variety of data that may be used by the system. For example, a user profile may include information about what accessories 106 are associated with the user 102 and/or device 104. The profile 304 may include, for accessory devices 106, a voice-controlled device 104 by which the accessory was "last seen." In this manner, as the user 102 moves an accessory 106 about the environment 108 (e.g., from the kitchen to a bedroom of the user's 102 house) that includes multiple voice-controlled devices 104, the accessory device 106 can wirelessly pair with a closest voice-controlled device 104 in proximity to the accessory device 106 and this information can be sent to the remote system 112 to dynamically update the profile 304 with the voice-controlled device 104 that was last paired with the accessory 106. This accessory-to-device (106-to-104) association can be dynamically updated as locations of the devices 104 and 106 change within the environment 108. Furthermore, the remote system 112 can use these accessory-to-device (106-to-104) associations to determine which devices 104 and 106 to send information and instructions to in order to coordinate the operation of an accessory 106 with an appropriate voice-controlled device 104. The profile 304 may also include information about how a particular accessory 106 may operate (e.g., display 113 output, light source 111 operation, animatronic movement, audio output, etc.). A user profile 304 may also contain a variety of information that may be used to check conditional statements such as address information, contact information, default settings, device IDs, user preferences, or the like.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4A:
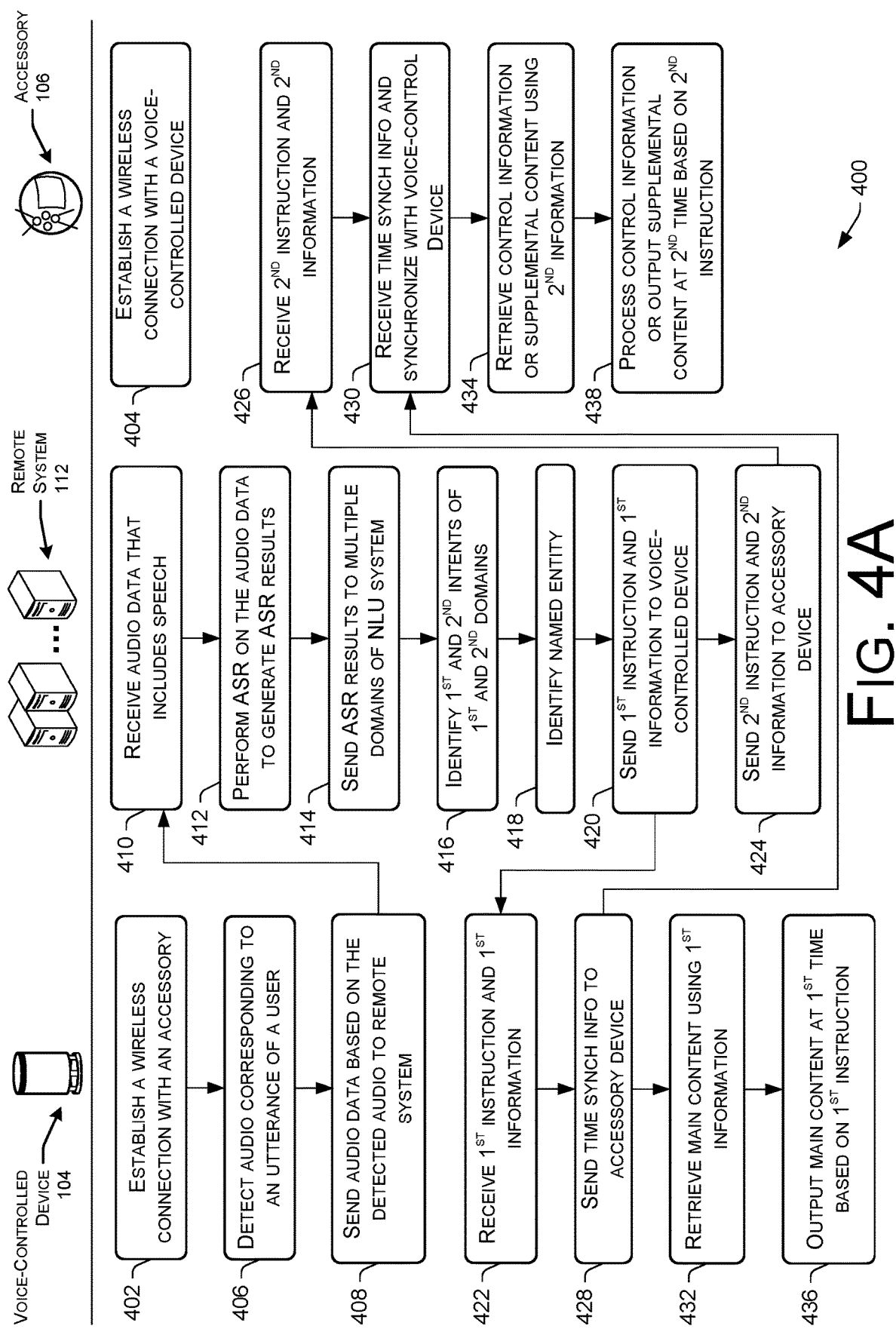
FIG. 4A is a flow diagram of an example process for coordinating operation of an accessory and a voice-controlled device in response to a user request.

FIG. 4A is a flow diagram of an example process 400 for coordinating operation of an accessory 106 and a voice-controlled device in response to a user request. For discussion purposes, the process 400 is described primarily with reference to the components of the previous Figures.

At 402, the voice-controlled device 104 may establish a wireless connection with an accessory 106, such as via a local area network, a direct wireless connection (e.g., Bluetooth pairing), or the like. The device 104 and the accessory 106 may be in the same environment 108, such as in a house or a similar environment 108. In some configurations, the connection at 402 is established in response to the accessory 106 being powered on and registered with a user 102 (or the device 104) to whom the device 104 is also registered. Block 404 reflects the establishment of this wireless connection from the perspective of the accessory device 106. Accordingly, the establishment of the wireless connection between the devices 104 and 106 can be initiated by either device.

At 406, a microphone(s) of the device 104 detects or captures audio 201 corresponding to a sound in an environment 108 of the device 104. The audio 201 may correspond to an utterance of the user 102, such as when the user 102 issues a voice command 110 to "Tell Accessory_Device to sing and dance to Artist_Name."

At 408, the device 104 sends audio data 203 to a remote system 112 over a computer network 114, the audio data 203 having been generated by the device 104 based at least in part on the sound captured by the microphone(s) of the voice-controlled device 104.

At 410, the remote system 112 receives the audio data 203 from the voice-controlled device 104. At 412, the ASR module 250 of the remote system 112 performs ASR on the audio data 203 to transforming the audio data 203 into a speech recognition result(s) (e.g., text data).

At 414, the speech recognition result(s) (e.g., text data) generated at 412 can be sent to multiple domains of an NLU system 260. For example, the ASR text data (or text form of the user's query) can be provided to each available domain of the NLU system 260 to prompt a score (e.g., a confidence) that is to be returned by each domain.

At 416, multiple intents are identified by the NLU system 260 (e.g., by the IC module 264), including at least a first intent 278 associated with a first domain, and a second intent 278 associated with a second domain. The determination to identify multiple intents at 416 and multiple corresponding domains (as opposed to a single domain) can occur in a variety of ways, as described herein. For example, a domain that returns a highest score in response to the ASR text data sent to the plurality of available domains may comprise a music domain, which may trigger the NLU system 260 to access a user profile 304 associated with the device 104 that sent the audio data 203, and determine whether any accessory devices 106 are associated with the user profile 304. The NLU system 260 may identify the user profile 304 based on metadata (e.g., an identifier of the voice-controlled device 104, an identifier of an accessory 106, etc.) that is sent from the device 104, perhaps in conjunction with the sending of the audio data 203 or at a different time (before or after sending the audio data 203). In some embodiments, the NLU system 260 may determine the presence of an accessory device 106 in the environment 108 by making a determination that the accessory device 106 was "last seen" by the voice-controlled device 104 that sent the audio data 203 at 408. Any suitable discovery technique, such as Bluetooth pairing, sharing of IP addresses, signal strength detection, etc., can be utilized by the devices 104 and 106 within the environment 108 to determine (or verify) the "presence" of an accessory 106 in the environment 108 and/or determine that the accessory 106 is in the vicinity of (e.g., within a threshold distance from) the voice-controlled device 104. In some embodiments, in response to the establishment of the wireless connection at blocks 402 and 404, information about the established wireless connection between the devices 104 and 106 is sent to the remote system 112 and stored in a user profile 304 of the user 102 to indicate that the accessory 106 was "last seen" by the voice-controlled device 104; that is, the voice-controlled device 104 "sees" the accessory device 106 by having successfully established a wireless connection with the accessory 106 in the environment 108, or by receiving information (e.g., an IP address of the accessory 106) over the LAN in the environment 108, or via the network 114. Upon receipt of any suitable indication that the accessory 106 is physically present within the environment 108, this indication can be used by the remote system 112 to verify the physical presence of the accessory 106 within the environment 108. Upon determining that the accessory device 106 is registered to the user 102 and/or present in the environment 108, as indicated by information in the user profile 304, the NLU system 260 may identify the second intent 278 associated with the second domain, which may comprise an accessory-related domain, such as a lip synch domain or a dance along domain. In some embodiments, the score returned by an accessory-related domain may be the highest ranking score, or in a top group of the highest ranking scores returned in response to the provisioning of the speech recognition result(s) at 414. In some embodiments, thresholding may be used to select multiple intents 278 from multiple domains, such as by selecting multiple domains that each return a score that meets or exceeds a threshold score. In yet other embodiments, domains may be functionally linked (or otherwise associated) to each other, and the selection of the first domain can trigger the selection of the second domain, if the second domain is functionally linked to the first domain, and respective intents 278 can be identified at 416 for each of the multiple domains. In the running example, the first intent may comprise a "play music" intent associated with the music domain, and the second intent may comprise a "lip synch" intent associated with the lip synch domain. The identification of multiple intents at 416 is not limited to two intents, however, as more intents may be identified in a similar manner, such as a "dance along" intent associated with a dance along domain when the user utters "Tell Accessory_Device to sing and dance to Artist_Name." In yet other embodiments, the identification of multiple domains at block 416 can be based at least in part on the identification, within the ASR text data, of a named entity associated with an accessory device 106, such as the name of an accessory device 106.

At 418, the NLU system 260 may identify a named entity within the speech recognition result(s) (e.g., the ASR text data). For example, if the user 102 uttered "Tell Accessory_Device to sing and dance to Artist_Name," at least the named entity of "Artist_Name" may be identified at 418. This named entity identified at block 418 may be in addition to the identification of an accessory-related entity within the ASR text data.

At 420, the orchestration component 128 (e.g., via a command processor 290) may send a first instruction and first information to the voice-controlled device 104 that sent the audio data 203 at block 408. At 422, the device 104 receives the first instruction and the first information over the network 114. The first instruction corresponds to the first intent. In the running example, the first intent can comprise a play music intent of the music domain. The first instruction, in this example, may instruct the voice-controlled device 104 to begin playback of particular musical content at a particular time. The first information (e.g., a URL) may be used to access main content associated with the named entity identified at 418. Accordingly, the orchestration component 128 may have previously determined where main content relating to the named entity is located/stored and may have provided the first information at 420 pointing to the location of the main content. In the case of a song by Artist_Name, the location may be a URL to a streaming service to stream or download the song to the device 104 for playback thereon.

Returning to the blocks of the process 400 performed by the remote system 112, at block 424 the orchestration component 128 (e.g., via a command processor 290) may send a second instruction and second information to the accessory device 106 due to the second domain implicating the accessory device 106. For example, if the second intent is a lip synch intent of the lip synch domain, which relates to the accessory devices 106, the command processor 290 may be invoked to send the second instruction and the second information to the accessory device 106. At 426, the accessory device 106 receives the second instruction and the second information over the network 114 (perhaps via the voice-controlled device 104 acting as a pass-through device). The second instruction corresponds to the second intent. In the running example, the second intent can comprise a lip synch intent of the lip synch domain, or any other accessory-related domain. The second instruction, in this example, may instruct the accessory device 104 to begin processing control information at a particular time. The second information (e.g., a URL) may be used to access the control information associated with the main content that is to be output by the device 104 at the time specified in the second instruction. Accordingly, the orchestration component 128 may have previously determined where control information relating to the main content is located/stored and may have provided the second information at 424 pointing to the location of the control information. If control information is not already in existence and accessible to the accessory device 106, the orchestration component 128 may be configured to generate control information (e.g., viseme information, dance information, etc.) "on-the-fly" using the main content. Once generated, the orchestration component 128 can store the control information in a network-accessible storage location for the accessory device 106 (and/or the voice-controlled device 104) to access over the network 114.

Returning to the blocks of the process 400 that are performed by the voice-controlled device 104, at block 428, the device 104 can send time synchronization information to the accessory device 106 for purposes of synchronizing time between the device 104 and the accessory device 106. Such a time synch protocol causes the respective clocks of the device 104 and the accessory 106 to be in sync with each other. In some embodiments, the sending of time synchronization information at block 428 comprises sending, by the device 104, timestamp information to the accessory 106 so that the accessory 106 can calculate and correct a time difference (Skew, drift=dSkew/dt) between itself and the device 104. The directionality of the flow of the time synchronization information can also be reversed where the accessory 106 sends the time synchronization information to the device 104. In any case, time synchronization establishes a common time base between the device 104 and the accessory. The devices 104 and 106 may have their own crystal oscillators that run at slightly different frequencies. For example, the respective crystals on the devices 104 and the accessory 106 can be off by some amount. If this difference is not corrected, the synchronicity between the operation of the accessory 106 and the output of the audio by the device 104 will break down over a period of time whereby the differences become observable to a user 102 who can perceive that the operation of the accessory 106 is not synchronized with the output of the main content by the device 104.

Accordingly, the relative offset between clocks (skew) and the relative change in skew over time (drift) can be measured and use to resample playback rates to match the devices 104 playback rate, thereby correcting the differences between respective clocks of the devices 104 and 106. A timestamp exchange technique can be used for measuring skew and drift across clocks of the devices 104 and 106. The device 104 can take a first timestamp and send it to the accessory device 106 at block 428, and the accessory device 106, at block 430 can receive the time synch information (e.g., the first timestamp). In some embodiments, the accessory 106, in response to the first timestamp's arrival at the accessory 106, can take a second timestamp and send it to the device 104. In response to the second timestamp arriving at the device 104, the device 104 can take a third timestamp. Other methods can also be used as well, such as user datagram protocol (UDP) broadcast techniques where timestamps are taken on both the device 104 (outgoing) side and the accessory 106 (incoming) side, while also attempting to minimize the time-in-flight from device 104 to accessory 106. Another possible technique is to use a high-resolution timing register in Wi-Fi beacon packet to synchronize devices (e.g., synchronizing to a Wi-Fi beacon of a wireless access point (WAP) in the environment 108).

At 432, the device 104 can retrieve main content using the first information it received at 422. The main content can comprise any suitable type of content, as described herein, such as, in the running example, an audio file corresponding to a song by Artist_Name for playback on the device 104. The retrieval of the main content at 432 may be in the form of streaming the main content from a content source associated with the remote system 112 or with a system of a third party service provider, or downloading the main content to the device 104.

At 434, the accessory 106 can retrieve control information or supplemental content using the second information it received at 426. The control information may include, without limitation, viseme information, dance information, and similar information that, when processed by the accessory device 106, causes a component(s) of the accessory device 106 to operate in coordination with main content as the main content is output via the voice-controlled device 104.

At 436, the device 104 may begin outputting the main content at a time according to the first instruction received at 422. At 438, the accessory 106 may begin processing the control information, or may begin outputting the supplemental content at substantially the same time based on a time specified in the second instruction received at 426. The exchange of the time synchronization information enables the coordinated operation between the devices 104 and 106 at blocks 436 and 438, respectively, on the assumption that the respective local clocks of the devices 104 and 106 are slightly off. That is, "coordinated" or "synchronized" operation of the accessory 106 with the device 104 at blocks 436 and 438 can mean substantially synchronized in the sense that output of the main content (e.g., audio content) by the devices 104 and the operation of the accessory's 106 component(s) (or output of the supplemental content by the accessory 106) cannot be out of synch by more than a threshold amount of drift (due to respective local clocks running at different frequencies) that is known to be perceptible to the human eye. A threshold drift on the order of milliseconds may be perceptible to the human eye when viewing the operation of a component of the accessory 106 along with the output of main content from the device 104, or the discernable amount of drift may be on the order of microseconds or seconds, in some cases, depending on the type of accessory 106 components (e.g., lights 111 vs. movable members) that operate in coordination with the audio being output by the device 104. Thus, synchronized operation of the accessory 106 with output of audio by the device 104, as used herein, can mean substantially synchronized in the sense that audio of the main audio content can start playback at the device 104 at a first time that is substantially the same time as (e.g., within milliseconds or microseconds of) a second time at which the accessory 106 begins processing the control information (or begins outputting the supplemental content), and the relative time offsets between the device's 104 local clock and the accessory's 106 local clock can drift over the course of playback up to a predetermined amount in order to be considered as maintaining "synchronicity". By maintaining synchronicity in this manner, any discernable difference in the timing between respective devices 104 and 106 is minimized, and often eliminated.

In some configurations, the second instruction received by the accessory 106 at block 426, when processed, causes the accessory 106 to select a mode of operation among multiple available modes of operation. As discussed in more detail below with respect to the accessory device 106, the accessory device 106 may be configured to operate in various modes of operation, such as a lip synch mode, a dance mode, a game mode, and so on. Thus, the control information may be correlated with the mode of operation, such as viseme information being correlated with the lip synch mode of operation, or dance information being correlated with the dance mode, and so on.

In the running example, the process 400 can enable synchronized mouth movement (via a digital animation and/or movable animatronic mouth of the accessory 106). In this scenario, the control information processed by the accessory 106 at 438 can comprise viseme information. Viseme information (a form of control information) allows for animated digital, or physical animatronic, mouth movements to be provided by the accessory 106 in synchronization with the words in the main audio content output by the device 104 at block 436. That is, viseme control information can be processed by the accessory 106 to tell the accessory how and when to move an actuating member representing a "mouth" of the accessory 106 and/or when to present particular digital mouth-related animations on the display 113. For music specific mouth movements (via a digital animation and/or movable animatronic mouth of the accessory 106), words in songs can be mapped to mouth movements, as will be described in more detail below. As such, a movable mouth member of the accessory 106 can be actuated in synch with the words sung in the song, not just the beat of the music. In order to do that, visemes and timings can be associated with the main audio content that are synchronized with the main content each time the user requests that feature.

In another example, the process 400 can also enable synchronized dance movements (via a digital animation on the display 113, light source 111 activation, and/or movable animatronic members of the accessory 106). Accordingly, the control information retrieved at 434 may include dance information that maps "dance movements" rendered on the display 113 or output via motorized actuation of a movable member(s) of the accessory 106. A beat detection algorithm can be used to derive a beat signature for the main content (e.g., a song), and this beat signature can be associated with the animated dance moves for presentation on the display 113, or with synchronized operations of motors of the accessory 106 to actuate movable members, and/or with synchronized operation of the light sources 111 to present a light show that is coordinated with the beat signature of the main content.

Figure 4B:
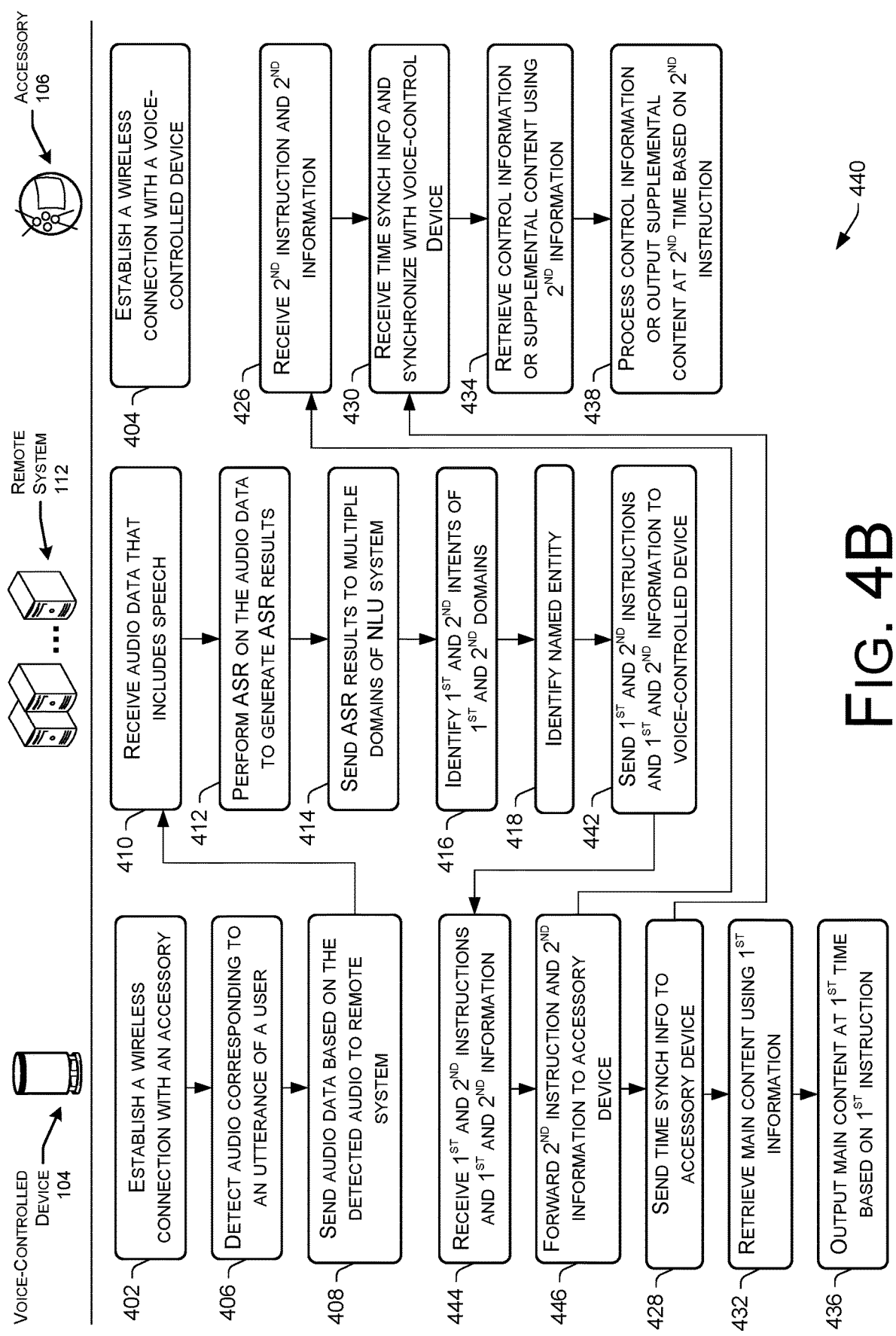
FIG. 4B is a flow diagram of an example process for coordinating operation of an accessory and a voice-controlled device in response to a user request where the accessory receives information and instructions from the voice-controlled device acting as a pass-through device.

FIG. 4B is a flow diagram of an example process 440 for coordinating operation of an accessory 106 and a voice-controlled device in response to a user request where the accessory 106 receives information and instructions from the voice-controlled device 104 acting as a pass-through device. For discussion purposes, the process 400 is described primarily with reference to the components of the previous Figures.

Blocks 402-418 of the process 440 can be carried out in a similar manner to that described with respect to blocks 402-418 of the process 400 shown in FIG. 4A. At block 442 of the process 440 shown in FIG. 4B, the orchestration component 128 (e.g., via a command processor 290) may send both a first instruction and a second instruction, as well as first information and second information to the voice-controlled device 104 that sent the audio data 203 at block 408.

At 444, the device 104 receives the first and second instructions and the first and second information over the network 114. The first instruction corresponds to the first intent, while the second instruction corresponds to the second intent.

At 446, the device 104 forwards the second instruction and the second information to the accessory 106. This transmission from the device 104 to the accessory 106 can occur over a short range wireless communication path (e.g., Bluetooth), via a LAN in the environment 108, or via the remote system 112 over the network(s) 114. Accordingly, in the process 440 of FIG. 4B, the device 104 acts as a pass-through for the accessory 106 such that the device 104 may receive the second instruction and the second information at block 444 instead of the accessory 106 receiving the second instruction and the second information directly from the remote system 112.

At block 428, the device 104 can send time synchronization information to the accessory device 106 for purposes of synchronizing time between the device 104 and the accessory device 106.

Blocks 432-438 of the process 440 can be carried out in a similar manner to that described with respect to blocks 432-438 of the process 400 shown in FIG. 3A. Alternatively, as the device 104 may utilize the second information it receives at block 444 to retrieve the control information or supplemental content instead of the accessory 106 retrieving the control information or supplemental content at block 434. In the scenario where the device 104 retrieves the control information or the supplemental content using the second information, block 434 may be performed by the voice-controlled device 104, and the device 104 may additionally forward the control information and/or the supplemental content to the accessory 106.

In either or both of the processes 400 and/or 440 of FIGS. 4A and/or 4B, the device 104, instead of outputting audio itself can stream the main content to the accessory 106 for playback (or output) on the accessory 106. In this example, the main content received by the device 104 at 432 can be associated with a "flag" to indicate that the device 104 should stream the main content to the accessory 106. In some configurations, the main content can be split into two content streams such that the device 104 receives two content streams at 432; one stream associated with the control information for the accessory 106, and another stream not associated with the control information. In this manner, the device 104 can playback the content stream that does not include the control information, and queue the control information-associated content stream for transmission to the accessory 106.

Figure 5:
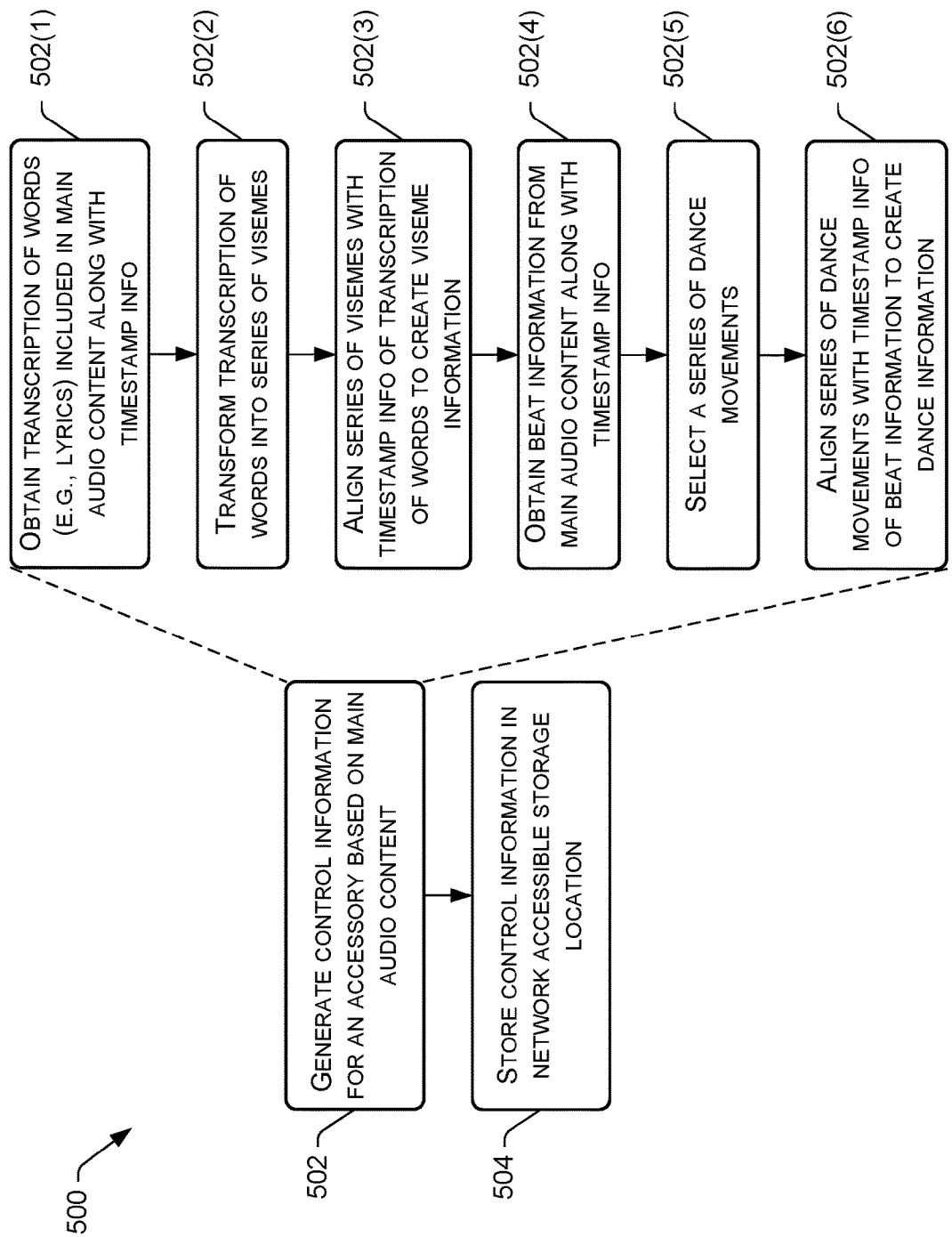
FIG. 5 is a flow diagram of an example process for generating and storing control information that is ultimately to be used for operating an accessory in coordination with output of content by a voice-controlled device.

FIG. 5 is a flow diagram of an example process 500 for generating and storing control information that is ultimately to be used for operating an accessory in coordination with output of content by a voice-controlled device. For discussion purposes, the process 500 is described primarily with reference to the components of the previous Figures.

At 502, a component of the remote system 112 may generate control information from main content (in this case audio content), wherein the main content is to be output by the device 104, and the control information is to be used to control operation of a component of the accessory 106 in coordination with the output of the main content by the device 104.

At 504, the control information may be stored in a storage location that is accessible using the second information (e.g., a URL) that is received by the accessory 106 at block 426 of the process 400. In this manner, if control information for particular audio content that is to be output by the device 104 is not already in existence, the process 500 allows for creation of the control information before carrying out the process 400, or "on-the-fly" in conjunction with the process 400.

The process 500 also shows a sub-process of block 502 that can be carried out to create viseme information and dance information (which are types of control information that can be processed by the accessory 106).

At 502(1), a component of the remote system 112 can obtain a transcription of words included in the main audio content along with timestamp information associated with the transcription of the words. In the case of audio content in the form of music, the transcription of the words obtained at 502(1) may comprise lyrics of a song. For non-music related audio content, the transcription of words may otherwise correspond to a story or narrative (e.g., corresponding to the text of an audio book), a podcast, or any similar audio content that includes words. In some configurations, block 502(1) occurs "on-the-fly" during the process 400, and as such, a call (e.g., an application programming interface (API) call) may be made into a music player application that is coordinating the playback of the main audio content on the device 104 to determine what the main content is (e.g., a song by Artist_Name), and may retrieve, from a transcription service of the remote system 112, the transcription (i.e., text) associated with the main content, such as the lyrics to the song. The transcription of words (e.g., lyrics) may be associated with timestamp information, such as phrase-by-phrase timestamps. Accordingly, along a period of time for playback of the audio content (e.g., the length of a song), a first phrase may be tagged with a first timestamp, a second phrase may be tagged with a second timestamp that occurs after the first timestamp, and so on, such that a series of phrases are organized on a time scale and mapped to specific times associated with a timescale for playback of the audio content. In the case of lyrics to a song, phrases are often broken down by a transcription service according to rhyme patterns identified in the song.

At 502(2), the transcription of the words can be transformed into a series of visemes. A viseme is a visual representation of a speech sound. Visemes, as used herein can take the form of a square wave that causes an animatronic mouth of the accessory 106 to open for the length of the square wave and then close at the end of the square wave, or a sine wave that causes a movable mouth to gradually open to a maximum amount at the peak of the sine wave and gradually close back down, or a waveform of a more complex shape that corresponds more closely with a word or individual syllables of a word. Thus, each word may be transformed into one or more visemes at 502(2) and arranged in a series according to the arrangement of the words in the transcription.

In an alternative embodiment, instead of using a transcription of words to generate a series of visemes, a component of the remote system 112 can analyze the main audio content to obtain frequency data that is indicative of spoken words in the main audio content. This frequency data can then be used to generate visemes. Thresholding can be utilized to determine likely starting and ending points of words such that when frequency data in the main audio content rises above a predefined frequency threshold, the time at which the frequency threshold is crossed can be taken as a starting point of a word, and when the frequency data subsequently falls below the frequency threshold, this subsequent threshold crossing can be taken as an ending point of the word. A viseme can be selected for the word, and at 502(3) of the process 500, the selected viseme can be aligned with the times where the frequency threshold was crossed in the frequency data. Thus, visemes can be generated without reliance on a transcription of words corresponding to the main audio content, but instead based on frequency data derived from the main audio content.

At 502(3), the series of visemes can be aligned with the timestamp information of the transcription of words to create viseme information that can be processed by the accessory 106 to at block 438 of the process 400 in order to exhibit mouth movements at appropriate times in synchronization with the words of the transcription, as the audio content is played back. The viseme information may be stored as the control information at 504 if the accessory 106 is operating in lip synch mode.

If the accessory 106 is to operate in dance mode, the process 500 may carry out blocks 502(4)-502(6) to create dance information. That is, at block 502(4), a component of the remote system 112 may obtain beat information based at least in part on the main audio content along with timestamp information associated with the beat information. A beat detection algorithm can be used for this purpose that analyzes noise energy along the time period for playback of the audio content. If noise energy can be plotted on such a time spectrum to identify peaks in noise energy, where peaks may correspond to beats, and the timestamp information of the beat information may map the times at which the peaks in noise energy occur along the length of the song.

At 502(5), a series of dance movements can be selected for mapping to the beat information derived at 502(4). The dance movements may correspond to predefined dance animations for presenting on the display 113, movements (e.g., back and forth, up and down, etc.) of movable members of the accessory 106, activation of particular lights 111 of the accessory, and so on. In some embodiments, a particular dance movement can be selected at a corresponding intensity level (e.g., range of motion, intensity of light output, etc.) based on the beat information, as will be described in more detail below.

At 502(6), the selected dance movements can be aligned with the timestamp information of the beat information to create dance information. For example, individual dance movements of a plurality of predefined dance movements can be mapped to the beats of the song so that the accessory 106 operates in a dance mode by dancing along with the song. This dance information can be stored as the control information at 504 in addition to, or in lieu of, the viseme information, depending on the mode of operation of the accessory 106. Thus, using the process 500, control information particular to music-related audio content can be generated and stored for access by the accessory 106.

Figure 6:
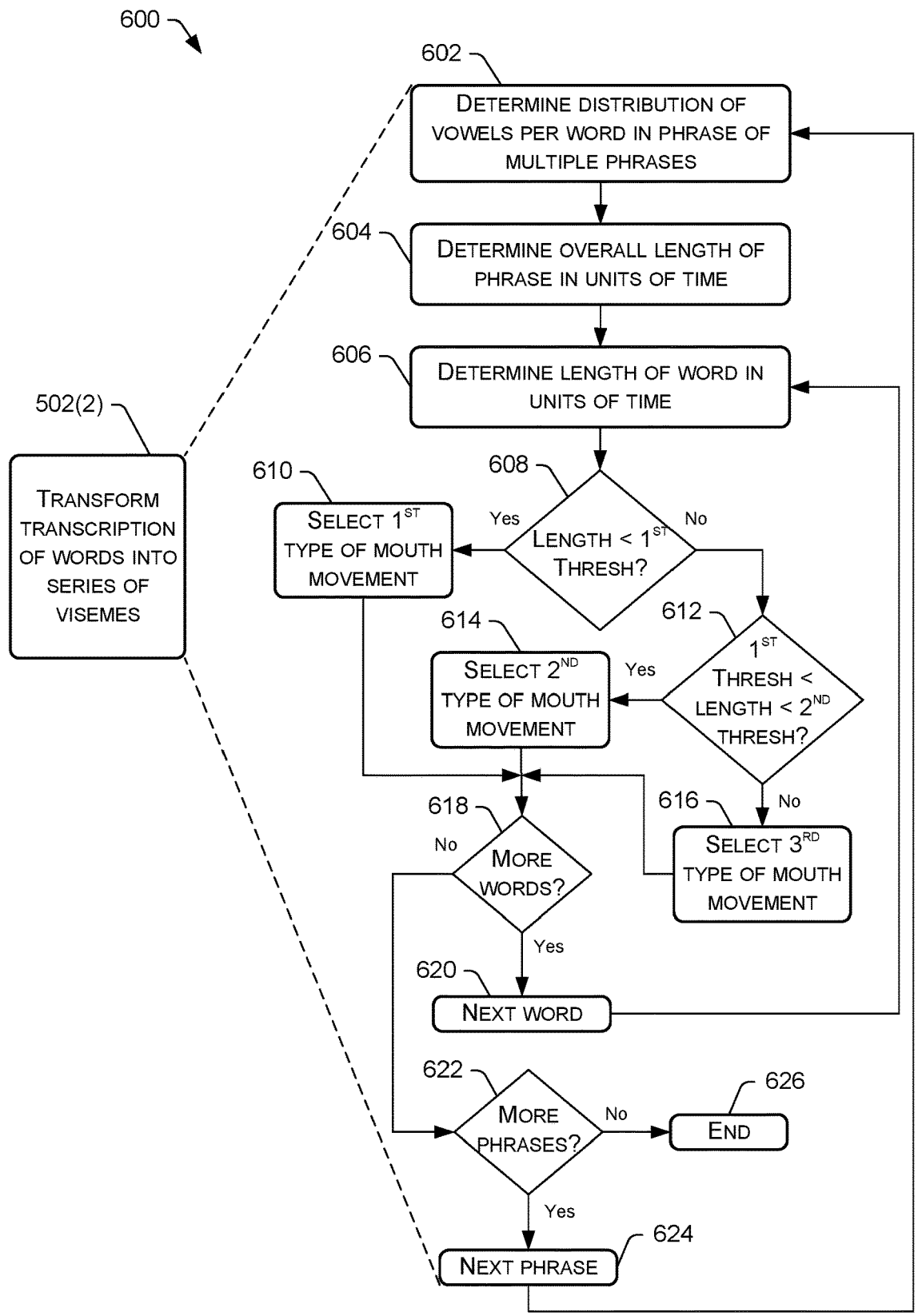
FIG. 6 is a flow diagram of an example process for generating control information in the form of viseme information from a transcription of words associated with audio content.

FIG. 6 is a flow diagram of an example process 600 for generating control information in the form of viseme information from a transcription of words associated with audio content. For discussion purposes, the process 600 is described primarily with reference to the components of the previous Figures. In addition, the process 600 can represent a sub-process of block 502(2) of the process 500 for transforming a transcription of words into a series of visemes.

At 602, a distribution of vowels per word in a particular phrase of a plurality of phrases of the transcription may be determined. As noted above, the transcription of the words in main audio content (e.g., lyrics of a song) may be organized into a plurality of phrases associated with corresponding timestamps. For instance, a first phrase of a song may be transcribed as the phrase "Don't stop believing." Accordingly, the distribution of vowels of this phrase may be determined at block 602 as {1:1:4} based on the word-vowel associations of "Don't": 1 vowel; "stop": 1 vowel; "believing": 4 vowels.

At 604, an overall length of the phrase in units of time may be determined based at least in part on a timestamp corresponding to the phrase. For example, the phrase "Don't stop believing" may have a length of about 4 seconds based on a difference between the timestamp for this phrase and the timestamp of the following phrase in the audio file.

At 606, the a length of each word in units of time can be determined based at least in part on the distribution of the vowels per word in the phrase in question determined at block 602. For a phrase that is 4 seconds long, and the example distribution of vowels of {1:1:4}, the first word "Don't" is allocated $\frac{1}{6}^{th}$ of the total length of the phrase because there are 6 total vowels in the phrase "Don't stop believing" and the first word "Don't" has 1 of the 6 vowels. Estimating the time-based length of a word in the phrase in this manner is based on the notion that vowels largely represent the spacing in time as a person speaks. Said another way, the word "Don't" may be allocated approximately ⅔ of a second of mouth movement over the entire phrase having a length of 4 seconds.

At 608, a determination is made as to whether the length of the word determined at block 606 is below a first length threshold. For example, thresholding may be applied along a spectrum of lengths based on heuristics. For example, the first length threshold may be set at 1 second (or another suitable threshold in any suitable unit of time). If it is determined that the length of the word is less than the first threshold, the process 600 follows the "yes" route from 608 to 610 where a first type of mouth movement is selected for the word. For example, a square wave type mouth movement may be selected at 610 that, upon processing at the accessory 106, causes a movable mouth of the accessory 106 (or a digital mouth-related animation) to open the length of the square wave (i.e., for the entire length of the spoken word).

If it is determined that the length of the word is greater than or equal to the first length threshold, the process 600 follows the "no" route from 608 to 612 where it is determined whether the length of the word determined at block 606 is between the first length threshold and a second length threshold (e.g., between 1 second and 2 seconds). If the length of the word is between the first and second length thresholds at 612, the process 600 follows the "yes" route from 612 to 614 where a second type of mouth movement is selected for the word. For example, a predefined waveform for a viseme that is previously-associated with the particular word may be selected as the second type of mouth movement. For example, a predefined waveform selected at 614 may comprise multiple peaks over the length of the waveform for a multisyllabic word.

If it is determined that the length of the word is greater than or equal to the second length threshold at decision block 612, the process 600 follows the "no" route from 612 to 616 where a third type of mouth movement is selected for the word. For example, a sine wave (smooth curve waveform) type of mouth movement may be selected at 616 that, upon processing at the accessory 106, causes a movable mouth of the accessory 106 (or a digital mouth-related animation) to open progressively wider and then shuts progressively smaller until close over the course of the waveform (i.e., for the entire length of the spoken word). After a type of mouth movement (i.e., viseme) is selected at block 610, 614, or 616 for a particular word in the phrase, a determination is made at block 618 as to whether there are more words in the phrase to be transformed into corresponding visemes. If there are more words in the phrase to be processed, the process 600 increments to the next word in the phrase at block 620 and iterates by returning to block 606 and proceeding through the process 600 for the next word.

When all of the words in a particular phrase of the transcription have been transformed into corresponding visemes (or mouth movement types), the process follows the "no" route from 618 to 622 where it is determined whether there are more phrases to be processed in the transcription. If there are more phrases to be processed, the process 600 increments to the next phrase in the transcription at block 624 and iterates by returning to block 602 and proceeding through the process 600 for the next phrase. When all of the phrases in the transcription have been processed by transforming the words in the phrases into visemes, the process 600 ends at 626, and the series of visemes can be aligned with the timestamp information in the transcription of the words at block 502(3) of the process 500, as described above.

In some embodiments, where a transcription of words is not utilize to generate viseme information, but instead, frequency data is used to generate viseme information, the length of a word can be determined from sequential frequency threshold crossings in frequency data obtained from the main audio content. For example, if frequency data rises above a predefined frequency threshold at time, $t_1$, and subsequently falls below the predefined frequency threshold at time, $t_2$, the length of the word in units of time can be determined based on the difference between time $t_2$ and time $t_1$. Thus, the process 600 can be modified to accommodate the use of frequency data instead of a transcription of words in order to select particular types of mouth movements for words having particular lengths in units of time.

Figure 7:
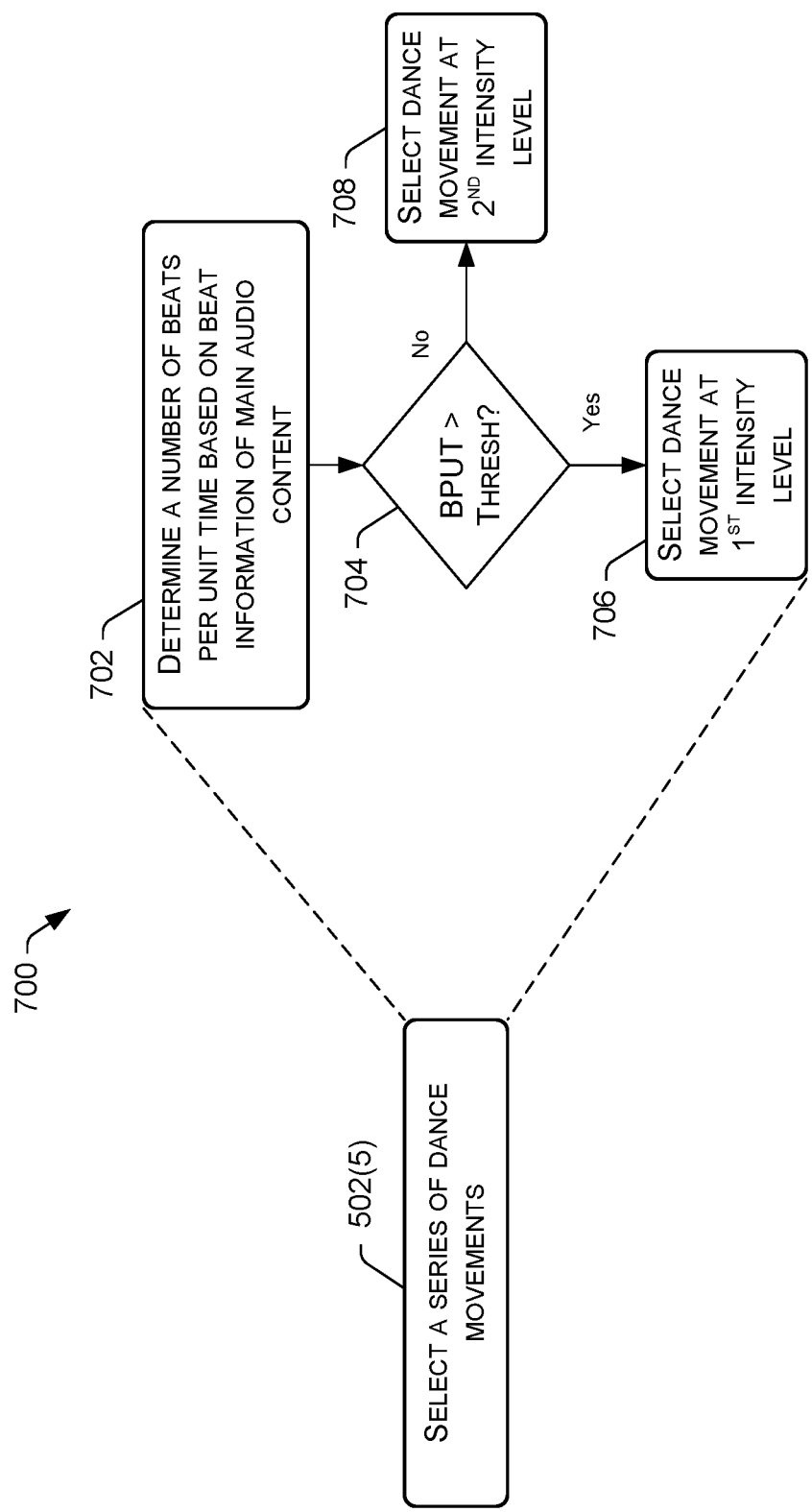
FIG. 7 is a flow diagram of an example process for generating control information in the form of dance information from beat information associated with audio content.

FIG. 7 is a flow diagram of an example process 700 for generating control information in the form of dance information from beat information associated with audio content. For discussion purposes, the process 700 is described primarily with reference to the components of the previous Figures. In addition, the process 700 can represent a subprocess of block 502(5) of the process 500 selecting a series of dance movements for particular audio content.

At 702, a number of beats per unit time (e.g., beats per minute) can be determined from main audio content based at least in part on the beat information obtained at block 502(4) of the process 500. In general, the selection of a series of dance movements at 502(5) of the process 500 may involve selecting predefined dance movements (e.g., predefined dance animations to present on the display 113, predefined movement patterns using waveforms and motors attached to movable members of the accessory 106, particular lights 111 and/or groups of lights 111 to activate, etc.). However, generic dance movements may be defined as general movement of a movable member, activation of a light(s) 111, presentation of a dance animation on the display 113, etc., and these generic dance movements can be carried out at different levels of intensity, such as by activating the lights 111 at different levels of intensity (e.g., by dimming or intensifying the lights), or defining particular ranges of motion for movable members of the accessory 106, such as range of motion for an appendage, like an arm of an animatronic toy. Accordingly, the beats per unit time may be used as a cue to select an appropriate intensity level using the process 700.

At 704, a determination is made as to whether the beats per unit time (BPUT) of the main audio content meets or exceeds a BPUT threshold. If the BPUT of the main audio content meets or exceeds the BPUT threshold at 704, the process 700 follows the "yes" route from 704 to 706 where a dance movement is selected at a first intensity level, such as a relatively high intensity level. If, on the other hand, the BPUT of the main audio content is less than the BPUT threshold at 704, the process 700 follows the "no" route from 704 to 708 where a dance movement is selected at a second intensity level, such as a relatively low intensity level. As noted above, the intensity level may correspond to a range of motion among multiple ranges of motion available for moving a movable member of the accessory 106, or a light output level of the lights 111 of the accessory 106. In this manner, the accessory 106 can be programmed to "dance hard" to faster or more intense music, and "dance softer" to more mellow music. Instead of beats per unit time, another metric can be used from the beat information such as amount of noise energy derived from the audio content, or any similar metric.

In some embodiments, the genre of music that is associated with the main audio content may dictate the intensity level at which a dance movement is implemented on the accessory 106. For example, the main audio content may include metadata that indicates a genre of music, such as Rock, Jazz, Hip Hop, and so on. Dance movements selected for the main audio content in line with the beat signature can be selected at different intensities for different genres of music. For example, a Rock genre may be associated with dance movements that are to be implemented at greater intensities on the accessory 106 as compared to intensities of dance movements for a Jazz genre of music.

Figure 8:
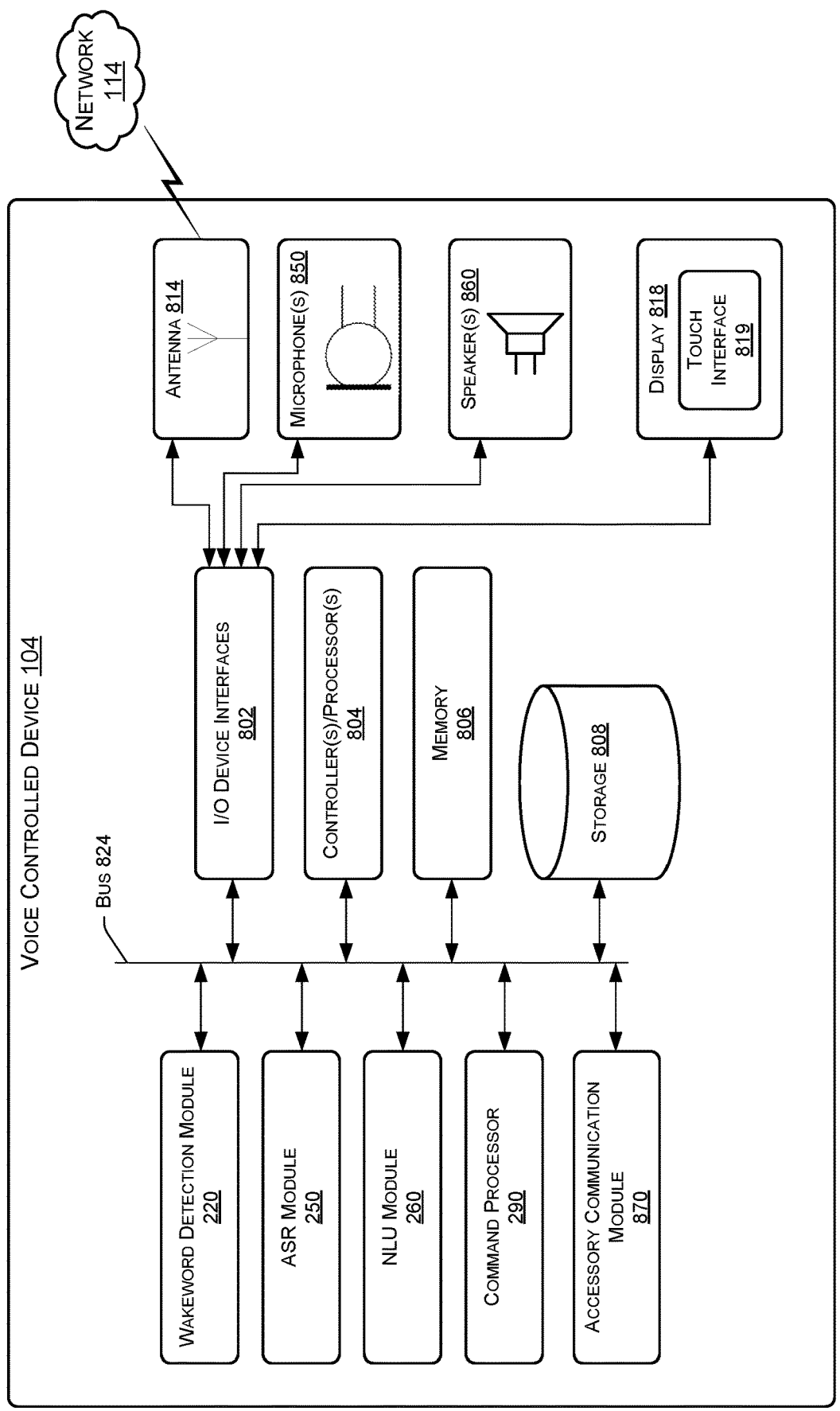
FIG. 8 is a block diagram conceptually illustrating example components of a device, such as the voice-controlled device, of FIG. 1 according to embodiments of the present disclosure.
Figure 9:
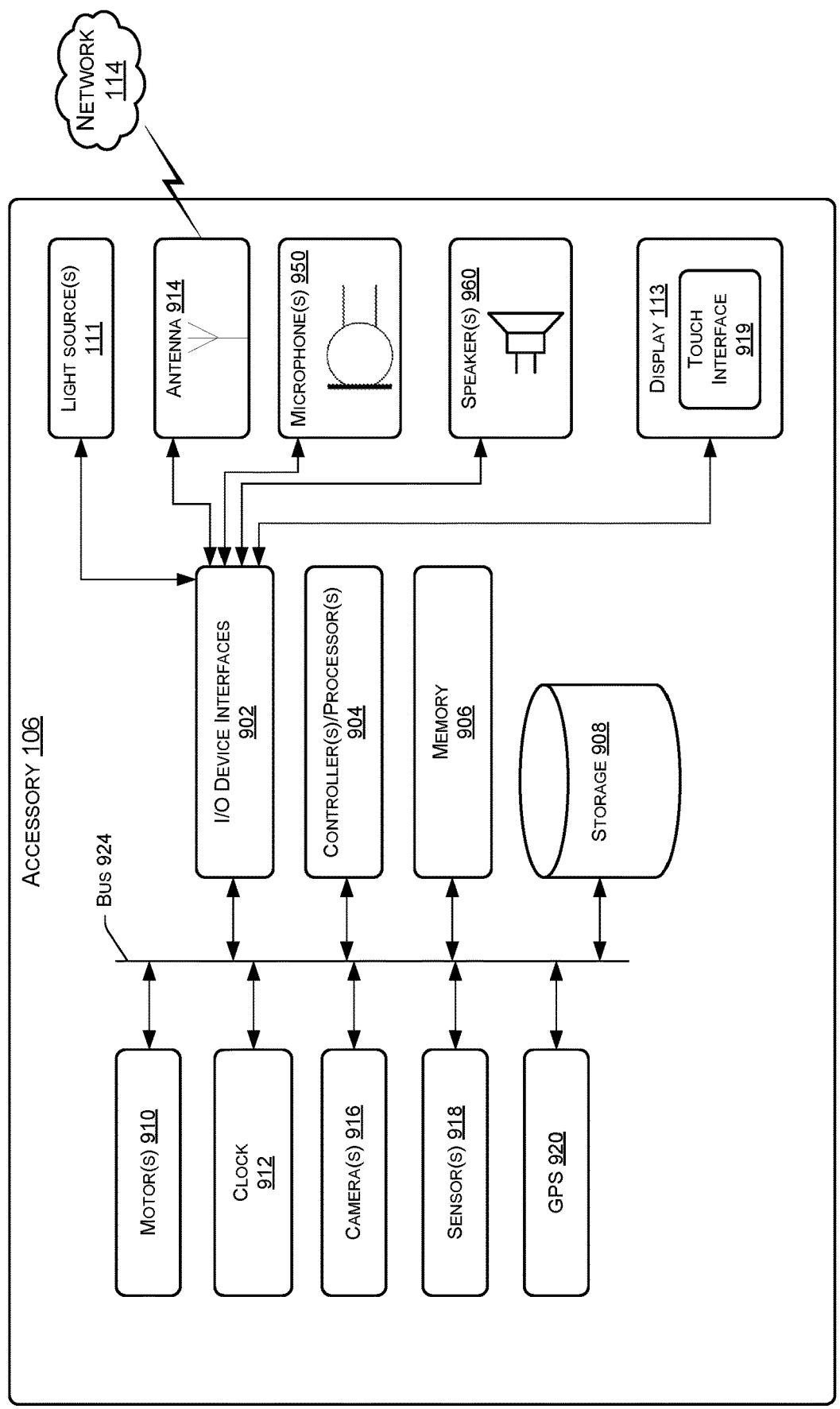
FIG. 9 is a block diagram conceptually illustrating example components of an accessory device according to embodiments of the present disclosure.

FIG. 8 is a block diagram conceptually illustrating example components of a device, such as the voice-controlled device 104, according to embodiments of the present disclosure. FIG. 9 is a block diagram conceptually illustrating example components of an accessory device 106 according to embodiments of the present disclosure. In operation, each of these devices (or groups of devices) may include computer-readable and computer-executable instructions that reside on the respective device (104/116), as will be discussed further below.

The voice-controlled device 104 may be implemented as a standalone device 104 that is relatively simple in terms of functional capabilities with limited input/output components, memory, and processing capabilities. For instance, the voice-controlled device 104 may not have a keyboard, keypad, or other form of mechanical input. The device 104 may also lack a display (other than simple lights, for instance) and a touch screen to facilitate visual presentation and user touch input. Instead, the device 104 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device 104. Nonetheless, the primary, and potentially only mode, of user interaction with the device 104 is through voice input and audible output. In some instances, the device 104 may simply comprise a microphone 850, a power source (e.g., a battery), and functionality for sending generated audio data 203 via an antenna 814 to another device.

The voice-controlled device 104 may also be implemented as more sophisticated computing device, such as a computing device similar to, or the same as, a smart phone or personal digital assistant. The device 104 may include a display 818 with a touch interface 819 and various buttons for providing input as well as additional functionality such as the ability to send and receive telephone calls. Alternative implementations of the voice-controlled device 104 may also include configuration as a personal computer 104. The personal computer 104 may include a keyboard, a mouse, a display screen 818, and any other hardware or functionality that is typically found on a desktop, notebook, netbook, or other personal computing devices. In an illustrative alternative example, the voice-controlled device 104 can comprise an automobile, such as a car, and the accessory device 106 can be disposed in the car and connected, via wired or wireless coupling, to the car acting as the voice-controlled device 104. In yet another example, the voice-controlled device 104 can comprise a pin on a user's clothes or a phone on a user's person, and the accessory device 106 can comprise an automobile, such as a car, that operates in coordination with the pin or phone, as described herein. In yet another example, the voice-controlled device 104 can omit the speaker(s) 860, and may include the microphone(s) 850, such that the voice-controlled device 104 can utilize speaker(s) of an external or peripheral device to output audio via the speaker(s) of the external/peripheral device. In this example, the voice-controlled device 104 might represent a set-top box (STB), and the device 104 may utilize speaker(s) of a television that is connected to the STB for output of audio via the external speakers. In yet another example, the voice-controlled device 104 can omit the microphone(s) 850, and instead, the voice-controlled device 104 can utilize a microphone(s) of an external or peripheral device to detect audio. In this example, the voice-controlled device 104 may utilize a microphone(s) of a headset that is coupled (wired or wirelessly) to the voice-controlled device 104. These types of devices are merely examples and not intended to be limiting, as the techniques described in this disclosure may be used in essentially any device that has an ability to recognize speech input or other types of natural language input.

Each of these devices (104/106) of FIGS. 8 and 9 may include one or more controllers/processors (804/904), that may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive (MRAM) and/or other types of memory. Each device (104/106) may also include a data storage component (808/908), for storing data and controller/processor-executable instructions. Each data storage component may individually include one or more non-volatile storage types such as magnetic storage, optical storage, solid-state storage, etc. Each device (104/106) may also be connected to removable or external non-volatile memory and/or storage (such as a removable memory card, memory key drive, networked storage, etc.) through respective input/output device interfaces (802/902).

Computer instructions for operating each device (104/106) and its various components may be executed by the respective device's controller(s)/processor(s) (804/904), using the memory (806/906) as temporary "working" storage at runtime. A device's (104/106) computer instructions may be stored in a non-transitory manner in non-volatile memory (806/906), storage (808/908), or an external device(s). Alternatively, some or all of the executable instructions may be embedded in hardware or firmware on the respective device (104/106) in addition to or instead of software.

Each device (104/106) includes input/output device interfaces (802/902). A variety of components may be connected through the input/output device interfaces (802/902). Additionally, each device (104/106) may include an address/data bus (824/924) for conveying data among components of the respective device. Each component within a device (104/106) may also be directly connected to other components in addition to (or instead of) being connected to other components across the bus (824/924).

The devices (104/106) may each include a display (818/113), which may comprise a touch interface (819/919). Any suitable display technology, such as liquid crystal display (LCD), organic light emitting diode (OLED), electrophoretic, and so on, can be utilized for the displays (818/113). Furthermore, the processor(s) (804/904) can comprise graphics processors for driving animation and video output on the associated displays (818/113). Or the device (104/106) may be "headless" and may primarily rely on spoken commands for input. As a way of indicating to a user that a connection between another device has been opened, the device (104/106) may be configured with one or more visual indicator, such as the light source(s) 111 of the accessory 106, which may be in the form of an LED(s) or similar component (not illustrated), that may change color, flash, or otherwise provide visible light output, such as for a light show on the accessory 106, or a notification indicator on the device (104/106). The device (104/106) may also include input/output device interfaces (802/902) that connect to a variety of components such as an audio output component such as a speaker (860/960) for outputting audio (e.g., audio corresponding to audio content, a text-to-speech (TTS) response, etc.), a wired headset or a wireless headset or other component capable of outputting audio. A wired or a wireless audio and/or video port may allow for input/output of audio/video to/from the device (104/106). The device (104/106) may also include an audio capture component. The audio capture component may be, for example, a microphone (850/950) or array of microphones, a wired headset or a wireless headset, etc. The microphone (850/950) may be configured to capture audio. If an array of microphones is included, approximate distance to a sound's point of origin may be performed using acoustic localization based on time and amplitude differences between sounds captured by different microphones of the array. The device 104 (using microphone 850, wakeword detection module 220, ASR module 250, etc.) may be configured to generate audio data 203 corresponding to detected audio 201. The device 104 (using input/output device interfaces 802, antenna 814, etc.) may also be configured to transmit the audio data 203 to the remote system 112 for further processing or to process the data using internal components such as a wakeword detection module 220. In some configurations, the accessory device 106 may be similarly configured to generate and transmit audio data 203 corresponding to audio 201 detected by the microphone(s) 950.

Via the antenna(s) (814/914), the input/output device interfaces (802/902) may connect to one or more networks 114 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the devices (104/106) via wired connection to an external alternating current (AC) outlet, and/or via onboard power sources, such as batteries, solar panels, etc.

Through the network(s) 114, the speech processing system may be distributed across a networked environment. Accordingly, the device 104 and/or resource 116 of the remote system 112 may include an ASR module 250. The ASR module in device 104 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 104 and/or the resource 116 of the remote system 112 may include a limited or extended NLU module 260. The NLU module 260 in device 104 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 104 and/or the resource 116 of the remote system 112 may also include a command processor 290 that is configured to execute commands/functions associated with a spoken command as described herein.

The device 104 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 104 may be configured collectively to identify a set of the directional audio signals in which the wake expression is detected or in which the wake expression is likely to have occurred.

With reference again to the accessory device 106 of FIG. 9, the accessory 106 can include a housing, which is shown in the figures (See e.g., FIGS. 1 and 2), merely by way of example, as a spherical housing, although the accessory housing is not limited to having a spherical shape, as other shapes including, without limitation, cube, pyramid, cone, or any suitable three dimensional shape is contemplated. In some configurations, the housing of the accessory takes on a "life-like" form or shape (such as an animatronic toy) that is shaped like an animal, an android, or the like. Accordingly, the accessory 106 can comprise movable or actuating (e.g., pivoting, translating, rotating, etc.) members (e.g., a movable mouth, arms, legs, tail, eyes, ears, etc.) that operate in accordance with control signals 108 received from the voice-controlled device 104. The accessory 106 can include one or multiple motors 910 for use in actuating such movable members. In this sense, the accessory 106 can be "brought to life" by the user 102 issuing voice commands 110 to the voice-controlled device 104, and the voice-controlled device 104 responding by controlling the operation of the accessory's 106 various components.

The accessory 106 may be configured (e.g., with computer-executable instructions stored in the memory 906) to select, or toggle, between multiple available modes based on commands (or instructions) received from the remote system 112 (in some cases, via the voice-controlled device 104), or based on user input received at the accessory 106 itself. For example, the user 102 can ask the voice-controlled device 104 to set the accessory 106 in a particular mode of operation (e.g., a lip synch mode, a dance mode, a game play mode, etc.) among multiple available modes of operation, and the accessory 106 can select the particular mode to cause various components (e.g., the light sources 111, the display 113, etc.) to operate in a particular manner based on the selected mode of operation. Additionally, the accessory 106 can select a mode of operation based on a current "mood" (e.g., happy, sad, etc.) of the accessory 106, which the accessory 106 may receive periodically from the remote system 112 directly or via the device 104, or the accessory 106 may periodically change "moods" among multiple available moods based on internal logic. Available modes of operation for selection can include, without limitation, a setup mode, a dance mode, a lip synch mode, a play (or game) mode, an emoji mode, an offline mode, a message mode, and so on.

A dance mode may be initiated by the user 102 uttering the command "Tell Accessory_Device to dance to music by Artist_Name," and the dance mode may cause the accessory 106 to operate in a particular manner, such as by operating an embedded display 113 to present an animation of a dancing figure (body) or character that is synchronized with the beat signature (i.e., dancing to the beat) of music that is playing via the accessory 106 and/or via the voice-controlled device 104, by activating individual lights 111 (or particular groups of lights 111) in accordance with the beat signature of the music, or by actuating one or more movable members (e.g., arms, hips, legs, tail, etc.) of the accessory 106 to move in a synchronized manner (i.e., perform dance moves) with the beat signature of the music. When there are multiple accessories 106, the group of accessories 106 can dance together in dance mode. In addition, the accessory 106 in dance mode can cause one or more of the light sources 111, which may be multi-color, to operate in coordination (e.g., a light show) with the beat signature of the music. It is to be appreciated that the housing of the accessory 106 may include a substantially translucent or transparent outer body (or shell) so that the display 113 and the light sources 111 can be embedded in the housing and behind the translucent outer body (or outer shell) to emit light through the translucent body so that it can be seen by the user 102. In addition, at least some of the motors 910 may act as vibration components that cause the accessory 106 housing to vibrate. Other vibration mechanisms, such as piezoelectric elements and the like may be used for vibration purposes, or to otherwise provide haptic sensation to a user holding the accessory 106.

Lip synch mode may be initiated by the user 102 uttering "Tell Accessory_Device to sing to music by Artist_Name," and the lip-sync mode may cause the accessory 106 to operate in a particular manner, such as by operating an embedded display 113 to present a mouth-related animation, such as an animation of a face (or lips) (e.g., of a particular character) that is synchronized with the words or lyrics of music that is playing via the accessory 106 and/or via the voice-controlled device 104, or by actuating one or more movable members (e.g., a mouth, or lower jaw portion of a mouth, etc.) of the accessory 106 to move in a synchronized manner (i.e., mouth the lyrics) with the words or voices heard in the audio of the music. When there are multiple accessories 106, the group of accessories 106 can sing together in lip synch mode.

The play (or game) mode may have various sub-modes, such as joke mode, story mode, fortune teller mode, trapped in the ball mode, or game mode with various games like trivia, tic-tac toe, rock-paper-scissors, and so on. Whenever the play (or game) mode involves outputting a TTS response via the accessory 106, such as when the accessory 106 tells a joke, a story, a fortune, or otherwise, the accessory 106 may display an animation of a face or lips, or an animation of an entire character, on the display 113 of the accessory 106 that "mouths" the words being output as audio via the accessory 106 or the voice-controlled device 104. Additionally, or alternatively, the accessory 106 can actuate a movable member (e.g., a mouth, lower jaw of a mouth, etc.) to provide an animatronic movement that is synchronized with the words being output as audio via the TTS output. Customized voices may be selected by the user to provide a unique voice for each accessory 106 when the accessory 106 outputs TTS responses via its own speaker(s) 960 or the speaker 860 of the device 104. In some embodiments, the voice-controlled device 104 and/or the accessory 106 can be configured with voice-recognition capabilities to recognize a user's voice and to respond using the name of the user. For example, unique speaker identification logic can be stored in the memory 906 of the accessory 106, and/or in the memory 806 of the device 104, so that members of a household can set their own customizable options, and watch the accessory 106 transform based on which speaker is invoking operation of the accessory device 106. Additionally, or alternatively, child-tuned ASR can be used by the device 104 and/or remote system 112 to recognize children's voices for better understanding and processing of speech commands from children. Pre-recorded audio can be stored in the memory (806/906) of the device (104/106), or received from another source by the device (104/106), to deliver proper tone and intonation for more expressive interactions.

A camera 916 can be mounted on the accessory 106 and utilized for purposes like facial recognition and determining the presence or absence of a user in the vicinity of the accessory 106 based on movement detection algorithms, etc. The camera 916 can also be used for locating the user 102 when the user 102 emits an audio utterance in the vicinity of the accessory 106. Alternative methods, such as echo-location and triangulation approaches, can also be used to locate the user in the room.

The accessory 106 can include additional sensors 918 for various purposes, such as accelerometers for movement detection, temperature sensors (e.g., to issue warnings/notifications to users in the vicinity of the accessory, and other types of sensors 918. A GPS 920 receiver can be utilized for location determination of the accessory 106.

The display 113 can present different games, like trivia, tic-tac-toe, etc. during play mode. Trivia games can be selected from among various categories and education levels to provide questions tailored to the specific user (e.g., math questions for a child learning basic math, etc.). Fortune teller mode may allow the accessory 106 to output a fortune as a TTS output for the user 102 (e.g., a fortune for the day, week, or month, etc.). Trapped in the ball mode may show a digital character on the display 113 and/or via the light sources 111 that is "trapped" inside the translucent housing of the accessory 106, looking for a way to get out, and the user 102 can interact with voice commands 110 detected by the voice-controlled device 104 and forwarded via control signals 108, to help the digital character escape the confines of the accessory 106.

Emoji mode may be another sub-type of play mode that causes the display 113 of the accessory 106 to present an Emoji of multiple available Emoji's that can lip-sync to music, and otherwise interact in various play modes, such as by voicing TTS output for storytelling, joke telling, and so on.

Offline mode may cause the accessory 106 to operate according to a subset of operations (e.g., a subset of jokes, stories, songs, etc.) stored in local memory of the accessory 106. This may be useful in situations where the accessory 106 is not connected to a network (e.g., a WiFi network), such as if the user 102 takes the accessory 106 on a road trip and the accessory 106 is outside of any available network coverage areas. A push button on the housing of the accessory 106, or a soft button on a touch screen of the display 113, can allow for the user 102 to easily engage the offline mode of the accessory 106, such as when the voice-controlled device 104 is unavailable or powered off.

The setup mode may allow the user 102 to configure the accessory 106, and the accessory 106 may demonstrate various ones of the available modes of operation during the setup mode. Set-up of the accessory 106 can be substantially "low-friction" in the sense that it is not overly complicated and does not require that the user interact with the accessory at all, other than powering the accessory 106 on, thereby allowing the user 102 to enjoy the accessory 106 quickly upon purchase. A companion application can be installed (e.g., downloaded) on a mobile device of the user 102 to interface with the accessory 106, such as to set-up the accessory (should the user choose not to use voice commands 110 for set-up). Such a companion application on a mobile device of the user 102 can also be used for messaging mode of the accessory 106, such as to send a message that is output (e.g., displayed, output via audio on speakers, etc.) of the accessory 106. For instance, a parent, guardian, or friend connected to the same account of the user 102 can send a message via the companion application to be output through the output device(s) of the accessory 106. Upon receipt of a message, the accessory 106 can provide a notification of the received message (e.g., activation of a light source(s) 111, presenting a message icon on the display 113, etc.), and may wait to playback the message until the user 102 requests playback of the message (e.g., via a voice command 110). Content can be updated at multiple different times (e.g., periodically, in response to a trigger, etc.) on the accessory 106 via the wireless interface of the accessory 106. In some configurations, parental consent can be enabled for the accessory 106 to restrict the accessory 106 to performing particular operations when a minor or child is detected via unique voice identification. The user can customize colors of the light sources 111, voices for TTS output via the accessory 106, and other customizable features in the setup mode.

The memory 906 of the accessory 106 can store computer-executable instructions that, when executed by the controller(s)/processor(s) 904, cause the accessory 106 to discover other accessories 106 registered to the user 102. The accessory 106 may be configured to publish an identifier (e.g., an IP address) for this purpose that is sent to the remote system 112, and each accessory may receive identifiers of all other accessories registered to the user 102 from the remote system 112. In this manner, accessories 106 can recognize each other and perform in a synchronized or meaningful way. Any suitable network protocol (e.g., UPnP) can be utilized to connect devices in this manner. Devices can also communicate using high frequency (i.e., inaudible to humans) tones and a modulator-demodulator algorithm to transmit data over audio. Accessories 106 can "banter" back and forth, such as by outputting audio, which is received by the voice-controlled device 104 and processed in a similar manner to audio detected as coming from the user 102, and thereafter, sending control signals 108 to an appropriate accessory 106 that is to respond to another accessory 106.

Computer-executable instructions may be stored in the memory 906 of the accessory 106 that, when executed by the controller(s)/processor(s) 904, cause various components of the accessory 106 to operate in a synchronized manner (i.e., in coordination) with audio output via speakers of the voice-controlled device 104 and/or via speakers of the accessory 106. For example, accessory device 106 may be configured to process control information that it receives from the remote system 112 (possibly routed through the device 104), and which is associated with an audio file or other TTS data that is to be output as synthesized speech output. In this manner, the accessory 106 can display digital animations on the display 113, operate the light sources 111, and/or actuate movable members of the accessory 106 in synchronization with the audio (e.g., an audio file, TTS response, etc.). Accordingly, the accessory 106 may receive the control information, possibly along with the associated audio file. The control information can include, without limitation, viseme information and/or dance information.

For time synchronization, the accessory 106 may include a clock 912 that can be referenced and correlated with clocks of other devices (e.g., other accessories 106, voice-controlled devices 104, etc.) via offset and skew parameters to allow the accessory 106 to maintain synchronization with other accessories 106 and/or with the device 104, such as when a group of accessories 106 "dances" to the same song, or when the accessory device 106 is to operate in a synchronized manner with audio output by the device 104. For instance, the device 104 can utilize an accessory communication module 870 to send time synchronization information (e.g., sending timestamps) to the accessory device 106, and the accessory device 106 can return time synchronization information (e.g., returning timestamps) to the device 104, which can be used to calculate offset and skew parameters so that respective clocks of the devices 104 and 106 (or clocks of multiple accessory devices 106) can be synchronized so that operation of the accessory 106 and the device 104 can be synchronized. The clock may also be used as a timer that, when expired, can emit a character specific sound to act as an alarm clock, a kitchen timer, etc. The accessory communication module 870 can further be utilized by the device 104 to communicate any suitable information and data to the accessory 106, such as the forwarding of a second instruction and second information, and/or forwarding of control information and/or supplemental content to the accessory 106, such as when the device 104 acts as a pass-through device that obtains information from the remote system 112 and sends the information to the accessory 106.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving, by a first voice interface device, audio data representing a user utterance;
determining, based at least in part on the audio data, that the user utterance corresponds to a request to perform a first action;
determining first data indicating a first device in proximity of the first voice interface device;
determining second data indicating the first device in proximity to a second voice interface device associated with the first voice interface device;
determining, based at least in part on the second data, that the second voice interface device last sent a first command to the first device; and
selecting the first device to perform the first action responsive to the request based at least in part on the second voice interface device last sending the first command to the first device.

2. The method of claim 1, further comprising:
determining an output type of output requested by the user utterance;
determining that the first device is associated with the output type; and
wherein selecting the first device comprises selecting the first device based at least in part on the first device being associated with the output type.

3. The method of claim 1, wherein:
the request is to output a first portion of content by the first voice interface device while outputting a second portion of the content by the first device; and
selecting the first device comprises selecting the first device based at least in part on the request being to output the second portion of the content while the first portion of the content is output by the first voice interface device.

4. The method of claim 1, further comprising:
receiving a voice command associated with the first action at the second voice interface device;
determining an interaction between the second voice interface device and a second device; and
causing, based at least in part on the interaction, the second device to perform a second action while the first action is performed by the first device.

5. The method of claim 1, further comprising:
receiving a voice command associated with the first action at the second voice interface device;
determining an interaction between the second voice interface device and a second device; and
causing, based at least in part on the interaction, the second device to perform the first action.

6. The method of claim 1, further comprising:
sending a second command to the first device based at least in part on selecting the first device;

determining that a response to the second command is not received within a predefined period of time from when the second command is sent;

determining that a second device is in communication with the first voice interface device; and sending a third command to the second device based at least in part on the second device being in communication with the first voice interface device, the third command configured to cause the second device to perform the first action.

7. The method of claim 1, further comprising:

determining that a second device is associated with the first device;

sending a second command to perform the first action to the first device based at least in part on selecting the first device; and sending a third command to perform the first action to the second device based at least in part on the second device being associated with the first device.

8. The method of claim 1, further comprising:

determining a first time indicator for when the audio data is received;

determining a second time indicator for when the first voice interface device last sent a prior command to the first device; and wherein selecting the first device comprises selecting the first device based at least in part on the first time indicator and the second time indicator.

9. The method of claim 1, further comprising:

determining that the first device has transitioned from a first location associated with the second voice interface device to a second location associated with the first voice interface device; and wherein selecting the first device comprises selecting the first device based at least in part on the first device transitioning from the first location to the second location.

10. The method of claim 1, wherein selecting the first device comprises selecting the first device based at least in part on a device type of the first device.

11. A system comprising:

one or more processors; and non-transitory computer-readable media storing instructions that, when executed by the one or more processors, cause the one or more processors to perform operations comprising:

receiving, by a first voice interface device, audio data representing a user utterance;

determining, based at least in part on the audio data, that the user utterance corresponds to a request to perform a first action;

determining first data indicating a first device in proximity of the first voice interface device;

determining second data indicating the first device in proximity to a second voice interface device associated with the first voice interface device;

determining, based at least in part on the second data, that the second voice interface device last sent a first command to the first device; and selecting the first device to perform the first action responsive to the request based at least in part on the second voice interface device last sending the first command to the first device.

12. The system of claim 11, the operations further comprising:

determining an output type of output requested by the user utterance;

determining that the first device is associated with the output type; and wherein selecting the first device comprises selecting the first device based at least in part on the first device being associated with the output type.

13. The system of claim 11, wherein:

the request is to output a first portion of content by the first voice interface device while outputting a second portion of the content by the first device; and selecting the first device comprises selecting the first device based at least in part on the request being to output the second portion of the content while the first portion of the content is output by the first voice interface device.

14. The system of claim 11, the operations further comprising:

receiving a voice command associated with the first action at the second voice interface device;

determining and interaction between the second voice interface device and to a second device; and causing, based at least in part on the interaction, the second device to perform a second action while the first action is performed by the first device.

15. The system of claim 11, the operations further comprising:

receiving a voice command associated with the first action at a second voice interface device;

determining an interaction between the second voice interface device and to a second device; and causing, based at least in part on the interaction, the second device to perform the first action.

16. The system of claim 11, the operations further comprising:

sending a second command to the first device based at least in part on selecting the first device;

determining that a response to the second command is not received within a predefined period of time from when the second command is sent;

determining that a second device is in communication with the first voice interface device; and sending a third command to the second device based at least in part on the second device being in communication with the first voice interface device, the third command configured to cause the second device to perform the first action.

17. The system of claim 11, the operations further comprising:

determining that a second device is associated with the first device;

sending a second command to perform the first action to the first device based at least in part on selecting the first device; and sending a third command to perform the first action to the second device based at least in part on the second device being associated with the first device.

18. The system of claim 11, the operations further comprising:

determining a first time indicator for when the audio data is received;

determining a second time indicator for when the first voice interface device last sent a prior command to the first device; and wherein selecting the first device comprises selecting the first device based at least in part on the first time indicator and the second time indicator.

19. The system of claim 11, the operations further comprising:

determining that the first device has transitioned from a first location associated with the second voice interface device to a second location associated with the first voice interface device; and wherein selecting the first device comprises selecting the first device based at least in part on the first device transitioning from the first location to the second location.

20. The system of claim 11, wherein selecting the first device comprises selecting the first device based at least in part on a functionality associated with the request.

* * * * *